United States Patent
Park

(10) Patent No.: US 7,382,717 B2
(45) Date of Patent: Jun. 3, 2008

(54) METHOD FOR GENERATING BETTER THAN ROOT RAISED COSINE ORTHOGONAL FREQUENCY DIVISION MULTIPLEXING (BTRRC OFDM)

(75) Inventor: Young-Seo Park, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 520 days.

(21) Appl. No.: 10/954,897

(22) Filed: Sep. 30, 2004

(65) Prior Publication Data

US 2006/0072486 A1 Apr. 6, 2006

(51) Int. Cl.
*H04J 11/00* (2006.01)
(52) U.S. Cl. .............. 370/203; 370/208; 375/269
(58) Field of Classification Search ........... 375/269; 370/203–210
See application file for complete search history.

(56) References Cited

U.S. PATENT DOCUMENTS

| | | |
|---|---|---|
| 3,511,936 A | 5/1970 | Saltzberg |
| 5,790,516 A * | 8/1998 | Gudmundson et al. ..... 370/210 |
| 6,654,431 B1 * | 11/2003 | Barton et al. ................ 375/346 |
| 2002/0150184 A1 * | 10/2002 | Hafeez et al. .............. 375/346 |

OTHER PUBLICATIONS

Beaulieu et al., Sep. 2001, IEEE Communication Letters, vol. 5, No. 9.*
Bernard Le Floch et al—Coded Orthogonal Frequency Division Multiplex—Proceedings of IEEE, vol. 83, No. 6, Jun. 1995—pp. 982-996.
Norman C. Beaulieu et al—A "Better Than" Nyquist Pulse—IEEE Communications Letters, vol. 5, No. 9, Sep. 2001—pp. 367-368.
Julian Cheng et al—Ber Performance of a Novel Pulse Shape in Cochannel Interfernce—.

* cited by examiner

Primary Examiner—Lester G. Kincaid
Assistant Examiner—Steven Lim

(57) ABSTRACT

An improved multicarrier modulation system and method is introduced which has the advantages of both isotropic orthogonal transfer algorithm orthogonal frequency division multiplexing (IOTA OFDM) and scalable advanced modulation (SAM). The invention reduces adjacent channel interference (ACI) in the multicarrier modulation system used in multicast systems by generating (2601) a spectrally efficient modified pulse for multicarrier modulation and then adapting (2605) the pulse at the edge of the subchannel for reducing the ACI product by the total multicarrier signal (2607). This BTRRC OFDM (2607) is an Offset OFDM with BTRRC pulse (2605) while the prior art RRC OFDM (604) is an Offset OFDM with RRC pulse (603). BTRRC OFDM has characteristics similar to RRC OFDM and has better power efficiency in simulcast or Nakagami fading environments where there is a timing error. Thus, BTRRC OFDM is desirable to substitute SAM in a simulcast environment.

14 Claims, 14 Drawing Sheets

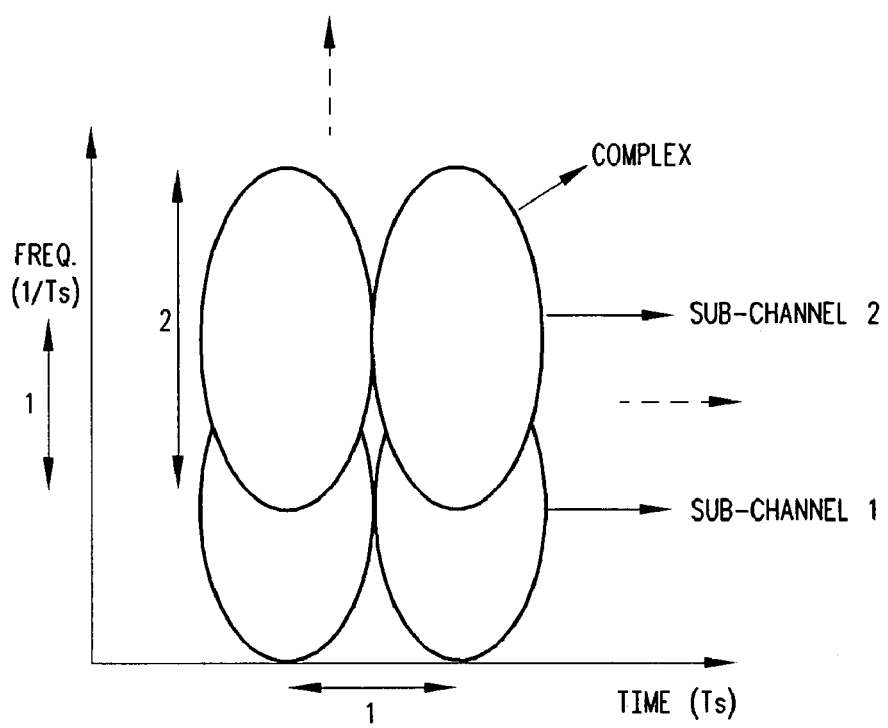
FIG. 1  -PRIOR ART-
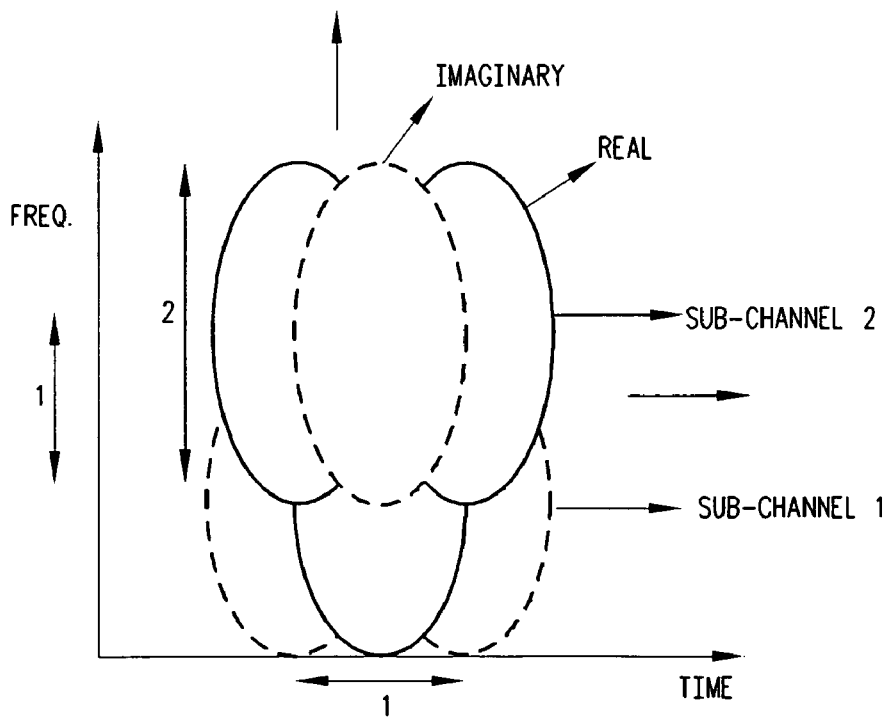
FIG. 2  -PRIOR ART-

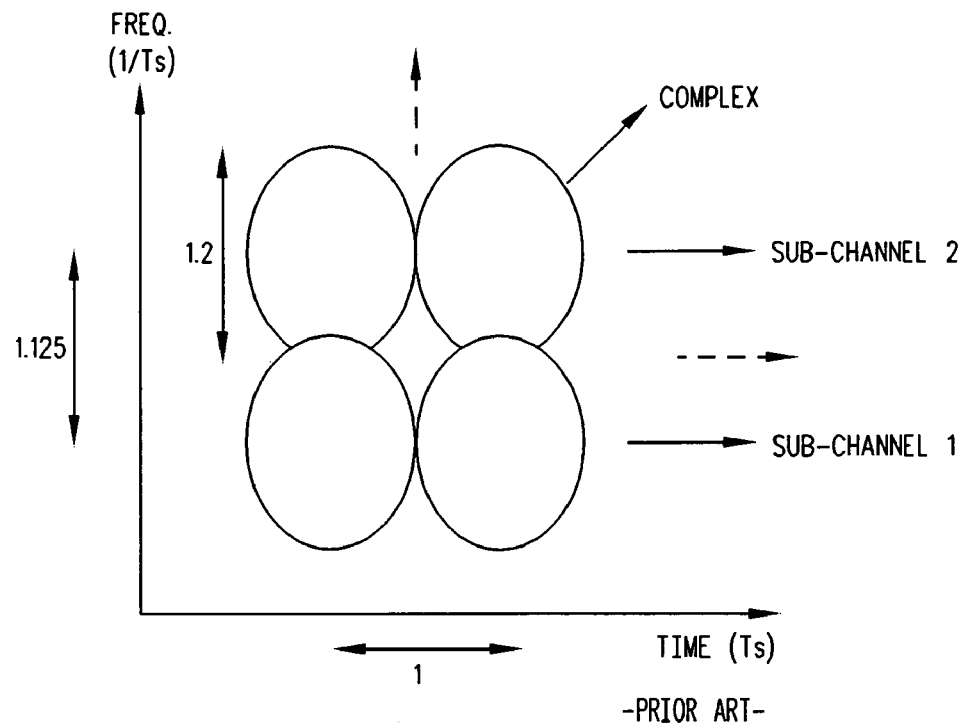
FIG. 3 —PRIOR ART—
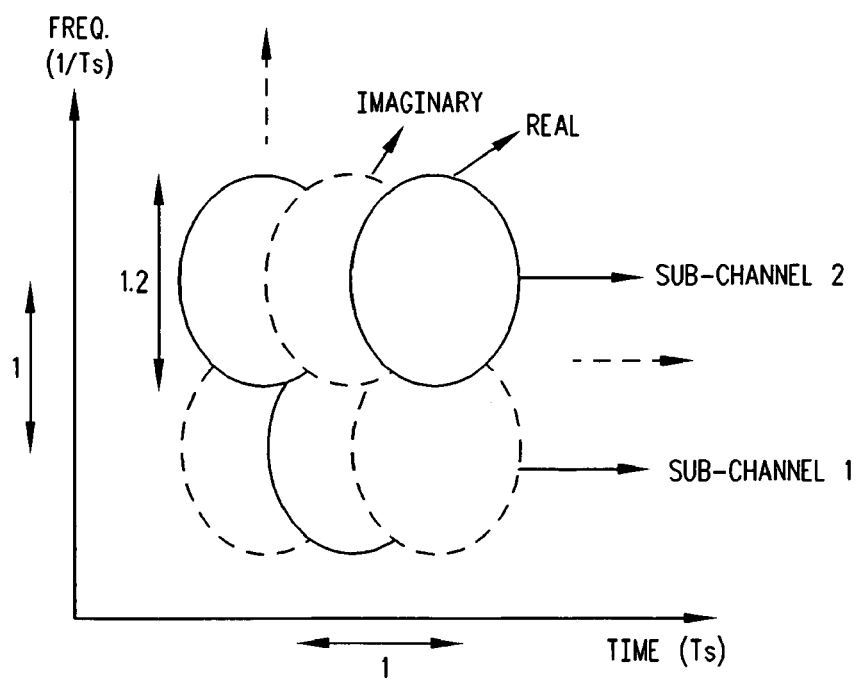
FIG. 4

METHOD FOR GENERATING BETTER THAN ROOT RAISED COSINE ORTHOGONAL FREQUENCY DIVISION MULTIPLEXING (BTRRC OFDM)

RELATED APPLICATIONS

This application is related to U.S. patent application Ser. No. 10/462,327 filed on Jun. 16, 2003, entitled System and Method for Generating a Modified IOTA Pulse for Reducing Adjacent Channel Interference (ACI) in an Isotropic Orthogonal Transfer Algorithm (IOTA) Orthogonal Frequency Division Multiplexing (OFDM) System; U.S. patent application Ser. No. 10/462,352, filed on Jun. 16, 2003, entitled A System and Method for Generating a Spectral Efficient Root Raised Cosine (RRC) Pulse for Increasing Spectral Efficiency; and U.S. patent application Ser. No. 10/462,506, filed on Jun. 16, 2003, entitled System and Method for Generating a Root Raised Cosine Orthogonal Frequency Division Multiplexing (RRC OFDM) Modulation, all of which are incorporated herein by reference.

TECHNICAL FIELD

This invention relates in general to digital communications and more specifically to orthogonal frequency division multiplexing (OFDM) or multi-carrier modulation systems.

BACKGROUND

As high-speed data transmission is required for multimedia communications, multi-carrier modulations such as orthogonal frequency division multiplexing (OFDM) or scalable advanced modulation (SAM) have been developed in order to accommodate these high-speed requirements. OFDM has been found to be an effective data transmission scheme for use with fading and multi-path transmission channels because it reduces inter-symbol interference (ISI) and makes equalization simple. The concept of using parallel data transmission and frequency division multiplexing (FDM) was first published as early as the mid 1960s. These schemes are adopted to avoid the use of high-speed equalization and to combat impulsive noise and multi-path distortion as well as to use the available bandwidth efficiently. In the early 1970s, the application of discrete Fourier transform (DFT) on FDM was discovered to eliminate arrays of sinusoidal generators and coherent demodulation making implementation of OFDM cost-effective. More recently, International Mobile Telecommunications-2000 (IMT-2000) chose MC-CDMA, which is an OFDM application, as a future code division multiple access (CDMA) standard, making the popularity of OFDM grow even more rapidly.

One of the problems associated with OFDM is adjacent channel interference (ACI). The ACI of OFDM is problematic in that the pulse shape of OFDM is rectangular and the spectrum of the pulse is a sum of a sinc function whose sidelobe fades very slowly. Therefore, although the −3 dB bandwidth of an OFDM signal is 10 kHz, its −40 dB bandwidth should be 100 kHz not to interfere with an adjacent channel signal. This problem has been solved generally by using a raised cosine window on the high sidelobe spectrum. However, the raised cosine window cannot reduce the ACI completely with reasonable nonlinear distortion. The ACI problem is not as serious when the number of subcarriers is very large (i.e., >~1024). However, the ACI problem is very serious when the number of subcarriers is small (i.e., <~128). The expanded bandwidth by the ACI is relatively large when the number of subcarriers is small and relatively small when the number of subcarriers is large, i.e., the percentage increase of bandwidth depends on the number of subcarriers. That is because the amount of the expanded bandwidth by the ACI is fixed for a given symbol rate. Thus, the seriousness of the ACI problem depends on the number of subcarriers.

The ACI problem is solved dramatically with an isotropic orthogonal transfer algorithm (IOTA) OFDM technique. The IOTA functions, which are the pulse shapes of IOTA OFDM, are not orthogonal to each other when they are spaced by 1/Ts in the frequency domain, as the rectangular pulses, which are the pulse shapes of OFDM, are orthogonal in regular OFDM. However, the IOTA functions are orthogonal to each other when they have real and imaginary data symbol alternations both in time domain and frequency domain as the pulse shapes of Offset QPSK are orthogonal to each other when they have real and imaginary data symbol alternations in time domain. Therefore, IOTA OFDM is a form of OFDM with an offset structure in time and frequency domain. The ACI problem of IOTA OFDM is not so serious because the spectrum of an IOTA function, which is the same with IOTA function in time domain, fades much faster than the spectrum of a rectangular pulse, which is a sinc function. However, its ACI still can be problematic when the number of subcarriers is very small (i.e., <~32) such as in a wideband radio protocol. To avoid ACI, the signal requires wide edge margins at both sides, which reduces the spectral efficiency of the signal. Therefore, the spectral efficiency of the IOTA OFDM can be worse than SAM because of the problem handling ACI.

SAM is merely an assembly of single-carrier modulations with a root raised cosine (RRC) pulse, which are overlapped slightly in frequency. SAM is spectrally less dense than IOTA OFDM because the RRC is not orthogonal when the subchannels are spaced by 1/Ts in frequency. The subchannel frequency spacing of SAM is (1+α−β)/Ts where α is a roll-off factor of RRC and β is an overlapped amount (α>β). However, a sidelobe of RRC spectrum fades faster than any other pulses. Therefore, SAM has better spectral efficiency than IOTA OFDM when the number of subcarriers is small because its ACI is minimal. But SAM is spectrally less efficient when the number of subcarriers is large because of the wider subcarrier spacing.

Thus, the ACI problem of OFDM that is not solved completely by IOTA OFDM and SAM may be solved by the inventions as discussed herein. The need exists for a new form of OFDM that has the both spectral advantages of IOTA OFDM and SAM while still offering the best spectral efficiency regardless of the number of subcarriers. A new ACI suppression scheme is needed to solve the ACI problem of these multicarrier modulation techniques by reducing the sidelobe without a considerable cost. The new invention should provide an ACI suppression method that uses a modified RRC pulse for a first form of multicarrier modulation and/or a modified IOTA pulse for a second form of multicarrier modulation. The modified RRC also can be applied to reduce the ACI of the single carrier signal as well as that of the multicarrier signal.

SUMMARY OF THE INVENTION

The present invention involves effective methods for mitigating adjacent channel interference (ACI) in multicarrier modulation systems such as OFDM and the like. These techniques include root raised cosine orthogonal frequency division multiplexing (RRC OFDM), an ACI suppression scheme for multicarrier modulations, a modified root raised cosine (RRC) pulse, a modified isotropic orthogonal transfer algorithm (IOTA) pulse and better than root raised cosine (BTRRC).

The BTRRC (Better Than Root Raised Cosine) pulse is a square root form of BTRC (Better Than Raised Cosine) and can be used in the Offset OFDM structure. IOTA OFDM and RRC OFDM are presently the only types of offset OFDM. Offset OFDM offers the best spectral efficiency in all OFDM forms since it is capable of using the fast fading pulses. BTRRC OFDM requires longer pulse length than RRC OFDM. However, the bit error rate (BER) performance exceeds that of RRC OFDM when the symbol timing is inadequate such as in strong multi-path fading or in a simulcast environment. Also, spectral efficiency of BTRRC OFDM is better than IOTA OFDM, SAM, or conventional OFDM. Hence, BTRRC OFDM is the most attractive multicarrier modulation in a simulcast environment.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 1 is a prior art time domain and frequency domain plot of a general orthogonal frequency division multiplexing (OFDM) signal structure where the data symbols can be all complex and the pulse shape is rectangular.

FIG. 2 is a prior art time domain and frequency domain plot of an isotropic orthogonal transfer algorithm (IOTA) OFDM signal structure where the alternated data symbols of real and imaginary are completely orthogonal to one other.

FIG. 3 is a prior art time domain and frequency domain plot of a scalable advanced modulation (SAM) signal structure where the data symbols can be all complex and the pulse shape is root raised cosine (RRC).

FIG. 4 is a time domain and frequency domain plot of a root-raised cosine (RRC) OFDM signal structure where the real and imaginary alternated data symbols are completely orthogonal to one other.

DETAILED DESCRIPTION OF THE PREFERRED EMBODIMENT

Figure 5:
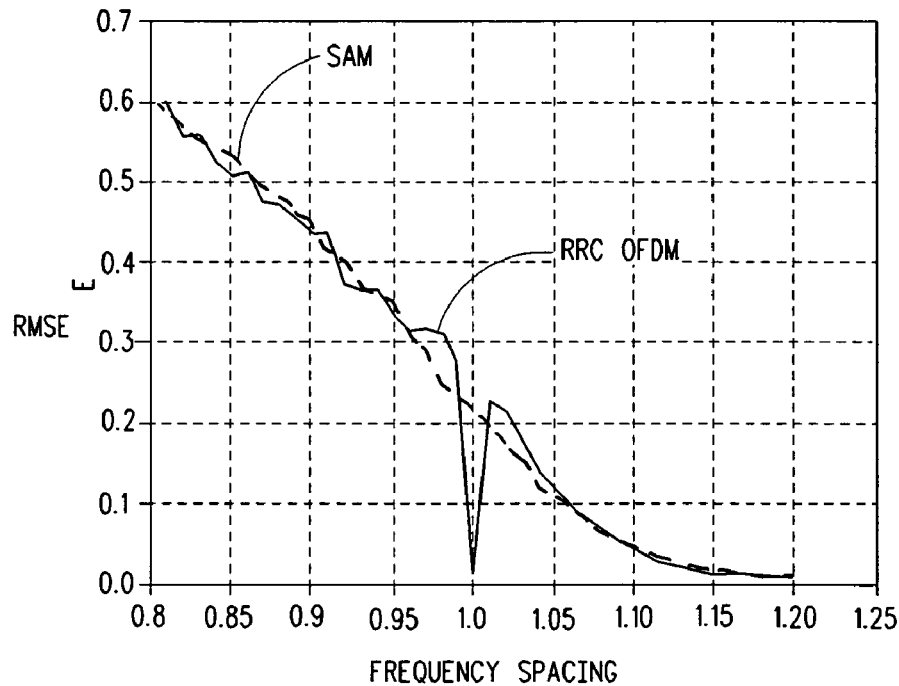
FIG. 5 is root mean squared error (RMSE) plot of RRC OFDM and a SAM system when the frequency spacing of subchannels is 0.8/Ts to 1.2/Ts and further where the RMSE is zero at 1/Ts when the subchannels are orthogonally spaced.

While the specification concludes with claims defining the features of the invention that are regarded as novel, it is believed that the invention will be better understood from a consideration of the following description in conjunction with the drawing figures, in which like reference numerals are carried forward.

RRC OFDM Method

The general single carrier signal such as binary phase shift keying (BPSK), quadrature phase shift keying (QPSK), or quadrature amplitude modulation (QAM) signals can be expressed as follows in baseband.

$$s(t) = \sum_{n=-\infty}^{\infty} d_n p(t - nT_s) \quad (1)$$

where the t is continuous time, the n is a symbol number in time, $d_n$ is a data symbol, P(t) is a pulse shape function, and the Ts(=$T_s$) is a symbol interval. The $d_n$ is real for BPSK and complex for QPSK or QAM. Then, the orthogonal frequency division multiplexing (OFDM) signal is merely the sum of the signal s(t) with 1/Ts frequency spacing when p(t) is rectangular pulse. Then, the general OFDM signal can be expressed as follows in baseband.

$$S(t) = \sum_{m=0}^{M-1} s_m(t)\exp(j2\pi(m/T_s - f_o)t) \quad (2)$$
$$= \sum_{m=0}^{M-1} \sum_{n=-\infty}^{\infty} d_{m,n} rect(t - nT_s)\exp(j2\pi(m/T_s - f_o)t)$$

where m is a subcarrier number or a symbol number in frequency, $s_m(t)$ is the signal s(t) of $m^{th}$ subcarrier, M is the number of total subcarriers, the rect(t) is a unit power rectangular pulse for a symbol period (Ts), and $f_o$ is a frequency shift of OFDM signal to the baseband center. The time domain and frequency domain plot of a general OFDM signal structure is shown in FIG. 1. The data symbols may all be complex and the pulse shape is rectangular. The symbols are greatly overlapped, however, they do not interfere with one other in view of their well-known orthogonality.

On the other hand, an Offset OPSK (OQPSK) or Offset QAM (OQAM) signal can be expressed as follows:

$$s^o(t) = \sum_{n=-\infty}^{\infty} j^n a_n p(t - nT_s/2) \quad (3)$$

where the data symbol $a_n$ is real and $j^n a_n$ is a real and imaginary alternating symbol in time. The real ($d_n$) becomes $a_{2n-1}$ and the imaginary ($d_n$) becomes $a_{2n}$. Then the data symbol is transmitted every Ts/2 while the symbol duration (Ts) remains the same. Consequently, the data symbols are overlapped by half. As will be recognized by those skilled in the art, the real and imaginary symbols do not interfere with one another in view of their orthogonality. This allows the same throughput by using these offset modulations with several advantages. The p(t) can be the greatest of these types of pulse shapes such as rectangular, sinusoidal, RRC, or IOTA. However, the orthogonality remains only for the isotropic orthogonal transfer algorithm (IOTA) and RRC pulses when an OFDM signal is generated by adding subcarrier signals of $s_m^o(t)$ with $1/T_s$ frequency spacing. The two dimensional (time and frequency) offset OFDM can be expressed by the following equation with real and imaginary data symbol alternation in time and frequency:

$$S(t) = \sum_{m=0}^{M-1} j^m s_m^o(t)\exp(j2\pi(m/T_s - f_o)t) \quad (4)$$
$$= \sum_{m=0}^{M-1} \sum_{n=-\infty}^{\infty} j^{n+m} a_{m,n} p(t - nT_s/2)\exp(j2\pi(m/T_s - f_o)t)$$

Since all the adjacent symbols in time and frequency have real and imaginary alternation, this Offset OFDM structure was used to implement IOTA OFDM where p(t) is an IOTA function. As best seen in FIG. 2, the signals of $s_m^o(t)$ have been recognized to be orthogonal to one another only when p(t) is an IOTA function. However, as seen in FIG. 4, it is recognized by those skilled in the art that these signals are also orthogonal when the pulse shape p(t) is RRC. FIG. 5 illustrates the root mean squared error (RMSE) plot of RRC OFDM and SAM system when the frequency spacing of subchannels is 0.8/Ts to 1.2/Ts. In FIG. 5, the RMSE is zero when the subchannels are orthogonally spaced. The RMSE of RRC OFDM goes to zero where the frequency spacing is 1/Ts although the RMSE of SAM that has the same RRC never goes to zero. This orthogonal phenomenon of RRC OFDM is very similar to that of general OFDM and IOTA OFDM. The orthogonality is not yet found to be valid with any other pulse shapes. It is not valid even with RC (raised cosine) pulse that is very similar to RRC. However, the other possible pulse is not necessary to be found because RRC is the most desirable pulse shape known for spectral efficiency.

Figure 7:
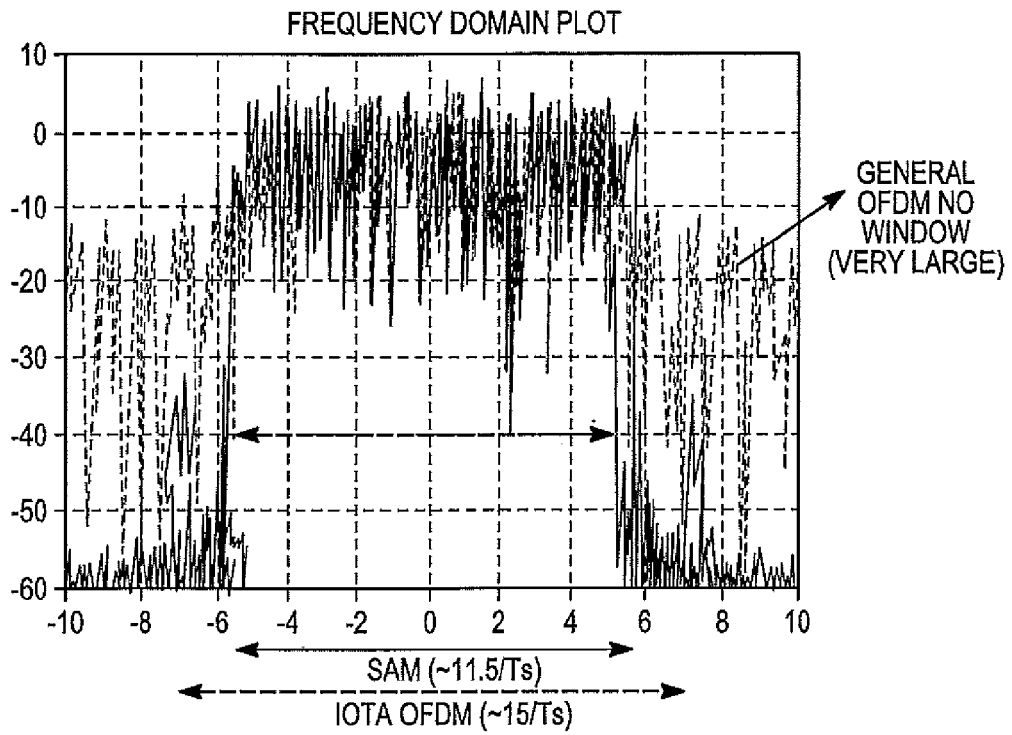
FIG. 7 is a diagram illustrating a comparison between the bandwidths of general OFDM, IOTA OFDM, RRC OFDM, and SAM without any ACI suppression scheme where the number of subchannels is 10, ACI requirement is −40 dB, and their data throughputs are all substantially equivalent.

FIG. 1 depicts a time domain and frequency domain plot of a general OFDM signal structure. The symbols are greatly overlapped, however, they do not interfere with one another because of the well-known orthogonality of rectangular pulses. However, the ACI with general OFDM can be serious because the sidelobes of the spectrum of the rectangular pulse, which is mathematically a sinc function, fades very slowly. Similarly, the slow fading spectrum of OFDM also can be seen in FIG. 7. Practically, the spectrum of general OFDM fades faster than that shown in FIG. 7 by using a raised cosine window; however, the spectrum still fades much slower than the other spectrums shown in this example. Therefore, the equivalent bandwidth of the general OFDM is worse than that of any others.

FIG. 2 depicts a time domain and frequency domain plot diagram of an IOTA OFDM signal structure illustrating the implementation of real and imaginary data symbol alternations both in the time domain and frequency domain. The symbols are overlapped but do not interfere with each other in view of the known orthogonality of the IOTA pulse. The spectrum is as dense as that of general OFDM, however, the equivalent bandwidth can be lesser than that of scalable advanced modulation (SAM) when the number of subcarriers is very small (i.e., <~32) in view of the slow fading sidelobe of an IOTA pulse.

FIG. 3 depicts a time domain and frequency domain plot diagram of a SAM signal structure illustrating the sum of general single carrier modulation signals with slight overlap of RRC ($\alpha$=0.2) pulses in frequency. The illustration depicts the frequency spacing at 1.125/Ts instead of 1.2/Ts. It is possible because this small overlap ($\beta$=0.075) does not seriously degrade the bit error rate (BER) performance. However, the frequency spacing of 1.125/Ts will expand the bandwidth by 12.5%. Therefore, the equivalent bandwidth of SAM is larger than that of IOTA OFDM when the number of subcarriers is large (i.e., >~128), even though the equivalent bandwidth is smaller when the number of subcarriers is very small (i.e., <~32).

FIG. 4 depicts a time domain and frequency domain plot of an RRC OFDM signal structure, which is the same as that of IOTA OFDM, but its pulse shape is RRC. The symbols are overlapped but do not interfere with each other because of the novel orthogonality of the RRC pulse. RRC OFDM has both spectral advantages of IOTA OFDM and SAM, which are dense spectrum and fast fading pulse, respectively. Therefore, RRC OFDM offers the best spectral efficiency regardless of the number of subcarriers. The equivalent bandwidth of RRC OFDM is approximately 95% of SAM (roll off $\alpha=0.2$, overlap $\beta=0.075$), 75% of IOTA OFDM, and less than 50% of general OFDM with a reasonable window when the number of subcarriers is 10 and the ACI requirement is −40 dB. These are calculated where the bandwidth of RRC OFDM is 0.5×19+0.75×2=11, IOTA OFDM is 0.5×19+2.5×2=14.5, and the bandwidth of SAM is 1.125×9+0.75×2=11.625. When the number of subcarriers is 64 and the ACI requirement remains the same, this is also approximately 87% of SAM, 95% of IOTA OFDM, and 65% of the general OFDM with a raised cosine window (roll-off 0.05). Thus, the offset OFDM with RRC, that is RRC OFDM and defined by the preferred method of the invention is the most spectrally efficient type of OFDM.

Figure 6:
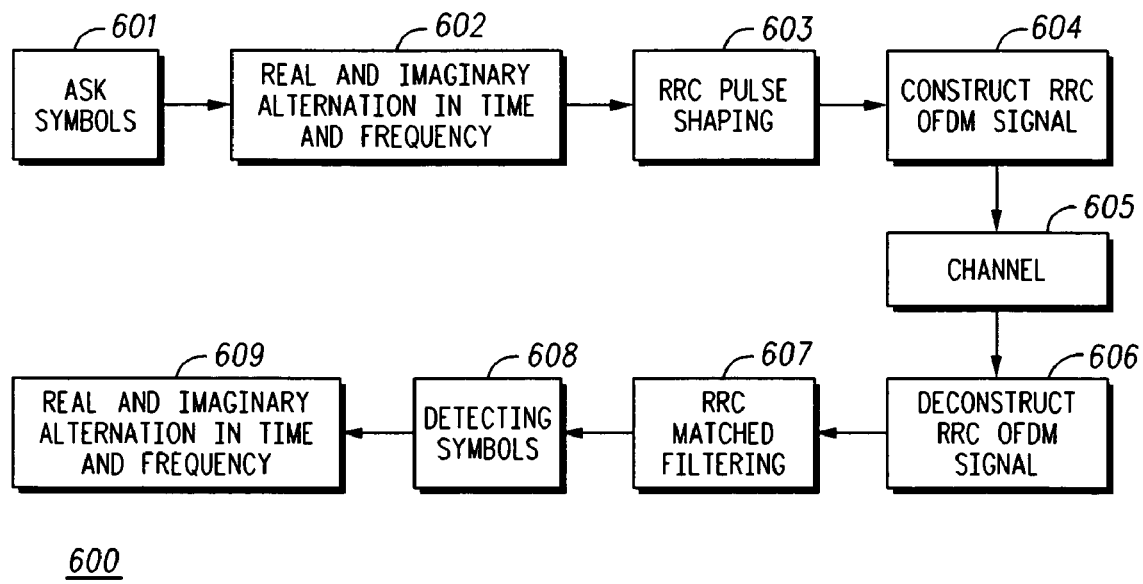
FIG. 6 is a simplified block diagram of an RRC OFDM system where the practical RRC OFDM system is implemented by poly phase filtering.

FIG. 6 illustrates the method of implementing RRC OFDM 600 according to the preferred method of the invention in a block diagram format. Amplitude shift keying (ASK) symbols are generated 601, which are normalized real symbols with generally 2, 4, and 8 signal levels. The RRC with 2, 4, and 8 level ASK corresponds to the OFDM with QPSK, 16QAM and 64QAM. The real and imaginary alternation 602 in the ASK symbol matrix shown is by equation (4) so that all the adjacent ASK symbols of a real ASK symbol are imaginary and all the adjacent ASK symbols of an imaginary ASK symbol are real. The subcarrier signals are generated 603 by using an RRC filter while the subcarrier signals are constructed 604 with 1/Ts frequency spacing as also seen in equation (4). However, the generating 603 and construction 604 steps can be implemented by advanced methods exploiting fast Fourier transform (FFT).

As will be further recognized by those skilled in the art, more practically the foregoing steps may be implemented by using overlap-added methods or polyphase filtering, which are the advanced digital signal processing (DSP) schemes. Further, the RRC OFDM signals are transmitted 605 on a channel, then demodulated using deconstruction 606 and matched filtering techniques 607 by the matching procedure of steps 603 and 604. The ASK symbols are detected 608 and the real and imaginary alternation as performed in step 602 is compensated 609. In analytical simulation models implemented using poly-phase filtering it was recognized that there is no power sensitivity loss from the subchannel overlap in additive white Gaussian noise (AWGN) channel due to the perfect orthogonality of RRC OFDM. Therefore, the BER of RRC OFDM in AWGN is the same as that of general OFDM or IOTA OFDM. The BER of RRC OFDM in a Rayleigh fading channel is also competitive when it is compared with that of SAM or IOTA OFDM.

ACI Suppression Scheme for Multicarrier Modulation Method

Figure 9:
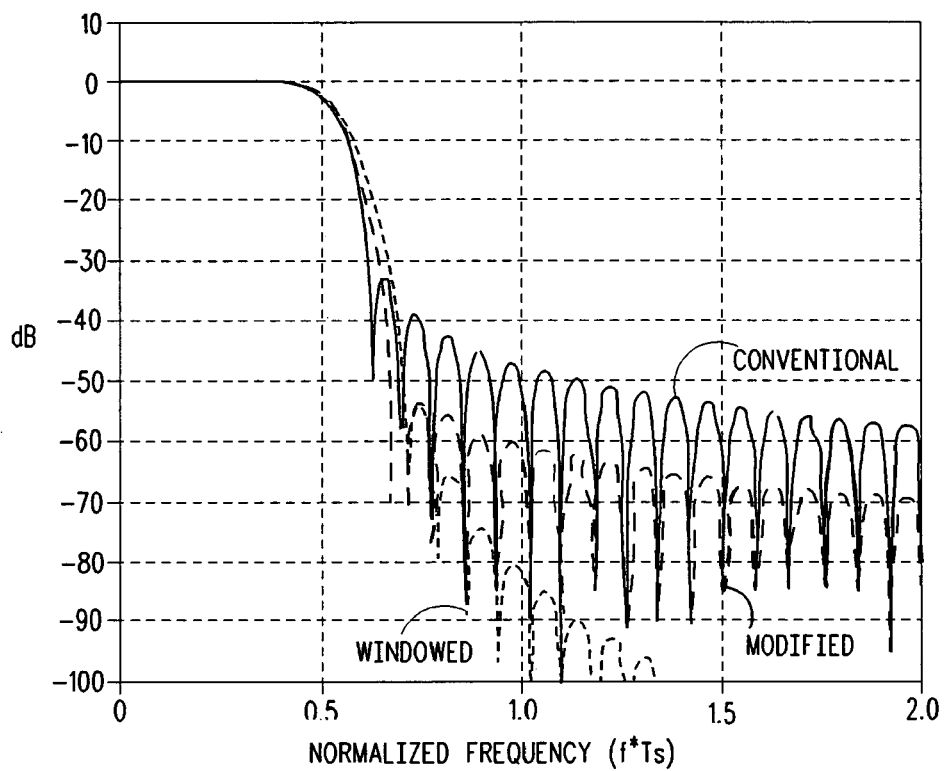
FIG. 9 is an analytical spectrum diagram of length 12Ts illustrating conventional RRC (roll-off 0.2), modified RRC (roll-off 0.2), and windowed RRC (roll-off 0.2).

Although RRC OFDM has very low ACI, the ACI can be reduced even further when an ACI suppression scheme is exploited. The ACI suppression scheme is very effective when the sidelobe of the pulse shape of the multicarrier system is high which causes serious ACI. The ACI suppression method of the present invention is very effective in RRC OFDM and SAM when the ACI requirement is lower than approximately −40 dB. As seen in FIG. 9, this is due to the fact that the sidelobe of conventional RRC causes serious interference at below −40 dB. The ACI suppression scheme is typically very effective in IOTA OFDM since the IOTA pulse has more serious sidelobe at below −40 dB than RRC pulse. These high sidelobes of RRC and IOTA pulses are not a problem in the middle of the multicarrier signal. However, they cause ACI problems at both edges of the multicarrier signals. The ACI suppression scheme is adopting a modified pulse that has fair orthogonality with the original pulse, small power sensitivity loss, and no serious sidelobe for the edge subcarrier signals. The number of edge subchannel signals is determined by the ACI requirement and the sidelobe property of the pulse shape. Although the modified pulse has some power sensitivity loss in BER, the total power sensitivity loss of whole multicarrier signal is negligible since most of the pulses in the entire signal are not the modified pulse. However, the bandwidth for a given ACI requirement is reduced considerably when the number of subcarriers is small (i.e., <~128). The performance of the ACI suppression scheme generally depends on finding a good modified pulse and deciding the number of edge subcarriers for the modified pulse.

Figure 8:
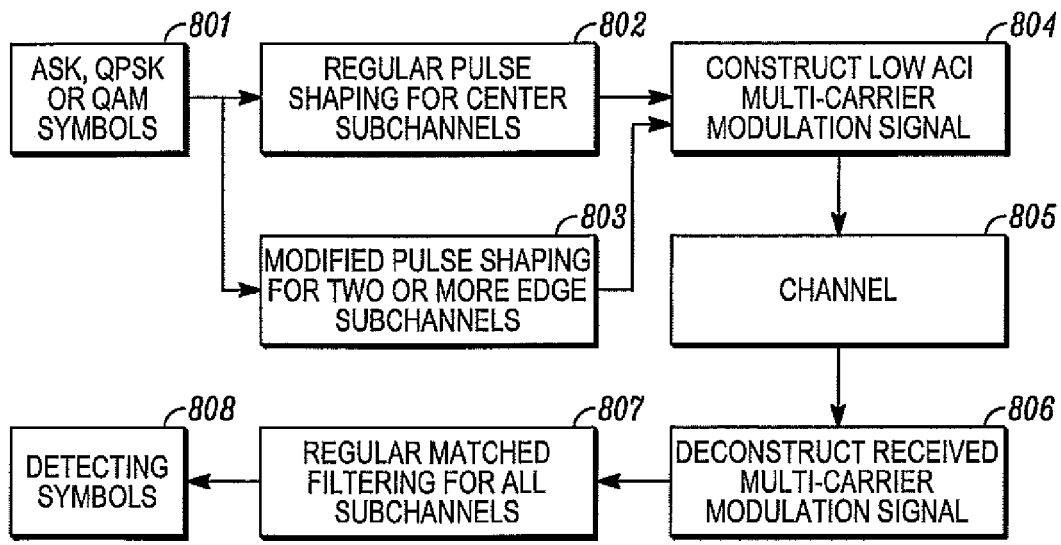
FIG. 8 is a block diagram illustrating implementation of an ACI suppression scheme by using a modified pulse for multicarrier modulations including SAM, RRC OFDM and IOTA OFDM.

FIG. 8 is a block diagram illustrating implementation of an ACI suppression scheme 800 by using a modified pulse for multicarrier modulations including SAM, RRC OFDM, and IOTA OFDM. The two or more edge subchannels use modified pulses 803 and the remainder of subchannels use conventional RRC pulses 802. The required number of edge subchannels is, for example, only two if the ACI requirement is greater than −54 dB in SAM. The required number of edge subchannels is also only two (one on each side) if the ACI requirement is greater than −48 dB in RRC OFDM since the sidelobes of the regular RRC pulse at the second most edge subchannels do not affect the −48 dB bandwidth of the entire RRC OFDM signal. If the required ACI is lower than −48 dB bandwidth, then the modified RRC pulse should be used in four edge subchannels. The required number of edge subchannels is generally larger in an IOTA OFDM system than in RRC OFDM or SAM because the IOTA pulse has bigger sidelobes. The regular pulse shaped signal 802 and modified pulse shaped signal 803 are then combined to construct 804 a low ACI multi-carrier modulation signal which is transmitted 805 over a channel.

The matched filter used for receiving does not require a modified pulse for the edge subchannels since the modified pulse is generally very similar to the regular pulse. The power sensitivity loss by using this regular matched filter for the subcarrier signal with the modified pulse is negligible. Therefore, the matched filter is conventional RRC for all subcarrier signals used with a regular matched filtering method 807 where symbols are later detected 808 and processed for use.

To summarize, like the method shown in FIG. 6, ASK symbols are generated 801 for RRC OFDM or IOTA OFDM, which generate QPSK or QAM symbols for SAM. The real and imaginary alternation is included in the generating processing for RRC OFDM and IOTA OFDM. The multicarrier signals of the center subcarriers are constructed 802 by polyphase filtering with a regular pulse and the multicarrier signals of the edge subcarriers are constructed 803 with a modified pulse. The low ACI multicarrier signal is constructed 804 by adding these two signals. Those skilled in the art will recognize that this multicarrier signal implementation procedure can be varied if the resulting multicarrier signal is identical. The multicarrier signal that is transmitted 805 through the channel is then deconstructed 806 by regular poly-phase filtering 807 or the like. As is known in the art, poly-phase filtering techniques use a regular pulse for all subchannel signals. The symbol detection 808 is then accomplished and the time and frequency alternation compensation is included for RRC OFDM and IOTA OFDM. Thus, the ACI suppression methods of the present invention do not require any modification of the multicarrier system on the receiver side. This allows the ACI suppression scheme to achieve the bandwidth reduction of a multicarrier signal with negligible increases in system complexity increase and/or power sensitivity loss.

Modified Root-Raised Cosine (RRC) Pulse Method

Figure 10:
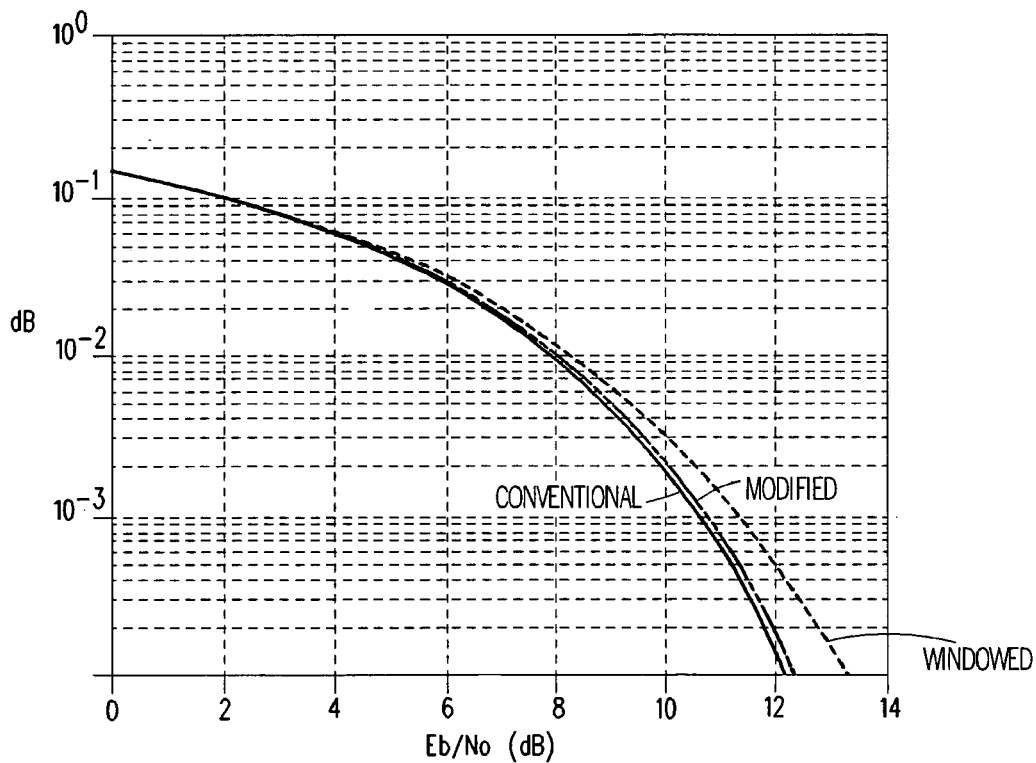
FIG. 10 is a simulated bit error rate (BER) diagram illustrating an ideal 16QAM system by using the length 12Ts conventional RRC, modified RRC, and windowed RRC of FIG. 9 illustrating result of a Monte Carlo simulation using 800,000 bits of random data.

The modified RRC was primarily developed for ACI suppression of signal carrier modulation. However, this method also shows excellent performance in multicarrier modulations such as RRC OFDM and SAM. Mathematically, the finite length of the RRC pulse (or filter) is expressed as follows:

$$RRC(t, \alpha, T_s, L_1) = \frac{4\alpha\cos[(1+\alpha)\pi t/T_s] + \sin[(1-\alpha)\pi t/T_s]/[t/T_s]}{\pi(1-(4\alpha t/T_s)^2)}, \quad (5)$$

where $-L_1/2 \leq t \leq L_1/2$ and the $L_1$ is an RRC pulse length, and $\alpha$ is a roll-off factor. As seen in FIG. 9, the sidelobes of RRC fade faster than other pulses, however, this may still be a problem when the required ACI is lower than −33 dB, the roll-off factor is 0.2 and the pulse length $L_1$ is 12Ts. As seen in FIG. 10, if a window were applied on the RRC pulse, the highest sidelobe would be down to −55 dB, however, the power sensitivity loss (BER degradation) at $10^{-3}$ BER is approximately 0.74 dB, which would not be negligible. Therefore, the present invention includes a modified RRC design method that has been developed to meet the required ACI with the negligible BER degradation.

Figure 11:
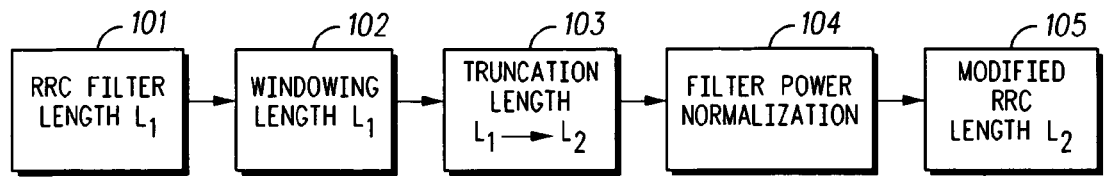
FIG. 11 is a block diagram showing the method for generating a modified RRC using windowing and truncation according to the preferred method of the invention.

FIG. 11 illustrates a block diagram depicting the procedure for producing a modified RRC according to yet another alternative embodiment of the invention. The equivalent equation can be expressed as follows:

$$MRRC(t,\alpha,Ts,WN,L_1,L_2)=NR[TR[WN[RRC\ (t,\alpha,T_s, L_1),L_1],L_2]], \quad (6)$$

where NR is power normalization, TR is truncation, WN is windowing, $L_1$ is the prototype RRC pulse or the window length, and $L_2$ is the truncation or the modified RRC pulse length. For example, in FIG. 11, an RRC (roll-off 0.2) pulse with length 18Ts ($=L_1$) is generated 101 and windowed 102 by a Hanning window with length 18Ts. The windowed pulse is then truncated 103 by a rectangular window with length 12Ts ($=L_2$). The pulse is divided 104 by its root mean square (RMS) value to be normalized. Thus, a modified RRC pulse with length 12Ts is generated 105, which has lower sidelobes than a conventional RRC pulse and has a smaller main lobe bandwidth than a windowed RRC pulse as shown in FIG. 9. It also has better power efficiency than the windowed RRC pulse as seen in FIG. 10.

The windowed RRC pulse has a large degree of BER degradation in view of its over-distortion. However, the modified RRC pulse has minimal BER degradation since it is distorted as little as possible as long as it meets the given ACI requirement. When the difference of $L_1$ and $L_2$ is small, the sidelobes fade faster but the BER degradation is larger. Therefore, it is possible to design the modified RRC for a given filter length, trading off between low sidelobes and BER degradation.

TABLE 1

Power and Spectral Efficiency of Various RRC filters

| Roll-off: 0.2 Filter length: 12Ts | Null-to-null BW | −40 dB BW | −50 dB BW | RMSE No Noise | Power loss at E-3 BER |
|---|---|---|---|---|---|
| Conventional RRC | 1.25/Ts | 1.48/Ts | 2.29/Ts | 0.006 | 0.03 dB |
| Windowed RRC (12Ts Hanning) | 1.43/Ts | 1.38/Ts | 1.41/Ts | 0.058 | 0.74 dB |
| Modified RRC (18Ts Hanning) | 1.34/Ts | 1.30/Ts | 1.32/Ts | 0.030 | 0.16 dB |

Figure 12:
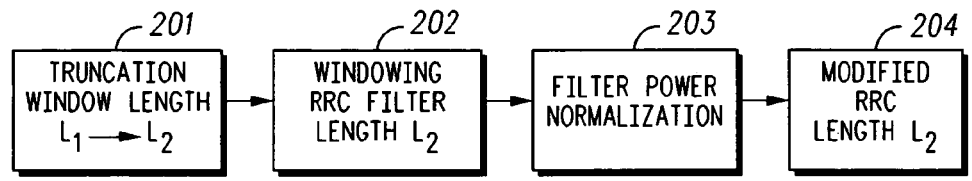
FIG. 12 is a block diagram illustrating an alternative method for generating a modified RRC using a truncated window.

As seen in FIG. 12, the modified RRC implementation method 200 is shown that can be altered even though the same result is achieved. A Hanning window with length 18Ts is truncated 201 by a rectangular window with length 12Ts. The prototype RRC pulse length 12Ts is then windowed 202 by the truncated Hanning window with length 12Ts. The pulse is also normalized 203 as FIG. 11. Thus, the same modified RRC pulse is generated 204 as in the method described in FIG. 11. Table 1 shows a detailed comparison between a conventional RRC pulse, the windowed RRC pulse, and the modified RRC pulse. These pulses are the same examples that were used in FIGS. 9 and 10 herein.

Figure 13:
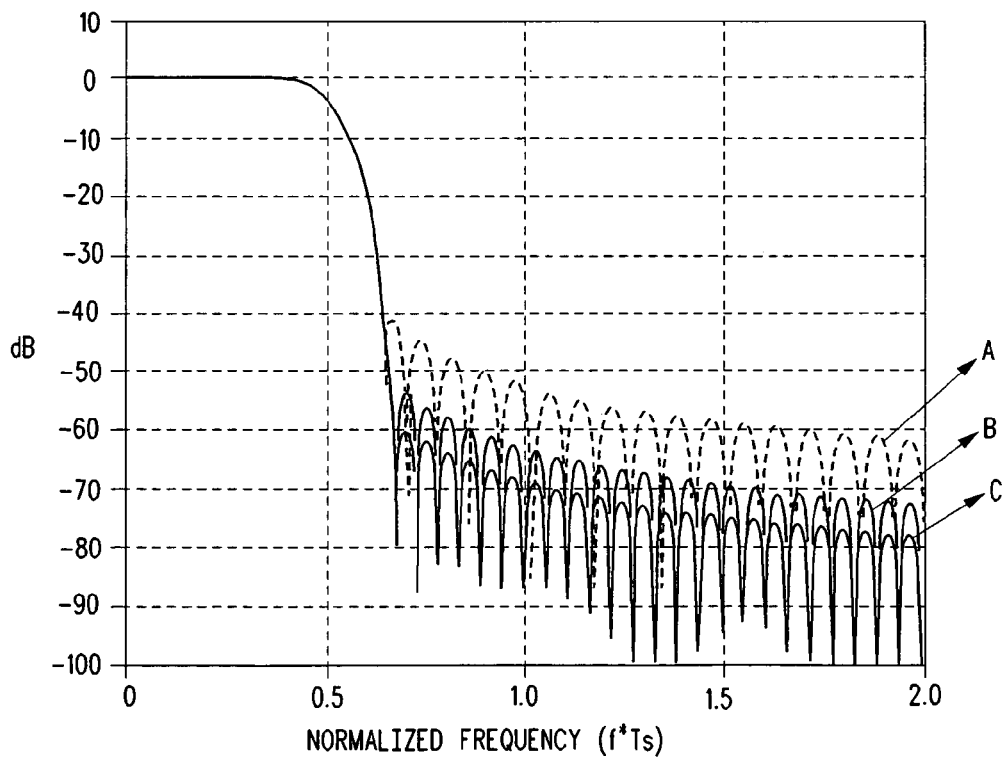
FIG. 13 illustrates a spectral diagram showing the superior design examples of modified RRC for −40 dB, −50 dB, and −60 dB ACI requirements.

FIG. 13 depicts the signal spectrum of good design examples of modified RRC for given ACI requirements. The modified RRC of waveform "A" is designed to meet the −40 dB ACI requirement. The filter length is 12Ts and the BER degradation is 0.06 dB at $10^{-3}$ BER. The modified RRC of waveform "B" is designed to meet the −50 dB ACI requirement. The filter length is 18Ts and the BER degradation is 0.04 dB at $10^{-3}$ BER. The modified RRC of waveform "C" is designed to meet the −60 dB ACI requirement. The filter length is 18Ts and the BER degradation is 0.08 dB at $10^{-3}$ BER. If more BER degradation were permitted, the filter length could be reduced fulfilling given ACI requirements.

Those skilled in the art will realize that this type of modified RRC pulse can be exploited for any single carrier system that uses an RRC pulse such as a QPSK or QAM system. However, this method also can be exploited for multicarrier modulations such as SAM and RRC OFDM with the ACI suppression scheme. The power sensitivity loss by using the modified RRC in a multicarrier system is even lower than in a single carrier system. This occurs since the modified RRC is generally adopted only at the two edge subchannels so that the BER degradation amount is a factor of 2/M where M is the number of subcarriers.

Modified Isotropic Orthogonal Transfer Algorithm (IOTA) Pulse Method

The MIOTA (modified IOTA) pulse is developed to apply the ACI suppression scheme on the IOTA OFDM system. The sidelobes of RRC are caused not by the RRC pulse shape but by the limited pulse length that is reduced by the windowing scheme. However, the sidelobes of IOTA are caused not by a limited pulse length but by the IOTA pulse shape, such that windowing does not reduce the high sidelobe effectively. This technique requires a strong and direct pulse modification. Thus, a new pulse shape modification method for low ACI is introduced in yet another embodiment of this invention.

The MIOTA pulse does not need to have low sidelobes at both sides as in the modified RRC pulse since the IOTA pulse is never used in a single carrier system. Therefore, this filter modification method suppresses the sidelobes at one side of the spectrum. The spectrum of the pulse shape can be controlled by modifying the pulse in the frequency domain and by taking its inverse Fourier transform (IFT) as a new modified pulse. The pulse is no longer a real pulse because the spectrum is not symmetric. However, it can be used because the imaginary portion of the modified pulse has very little power since the distorted amount is minimal.

Those skilled in the art will further recognize that there were other proposals in industry to use a MIOTA pulse that did not have symmetric spectrum at the two outer subchannels (one on each side). The general ACI suppression scheme of this approach uses a low ACI pulse at the outer subchannels. This type of pulse might be termed a "Gaussian MIOTA" because one side of the PSD looks like the spectrum of a Gaussian pulse and the other side looks that of an IOTA pulse. It should be recognized that the Gaussian MIOTA pulse is formed by removing appropriate terms in the series expansion of the IOTA function in the frequency domain. Although the detailed filter coefficients are not disclosed, the filter can be simulated by an IFT method, which is a new pulse shape modification scheme. From the experience simulating the Gaussian MIOTA, a superior MIOTA could have been designed by using the IFT modification scheme. The BER degradation of MIOTA is smaller when the left and right sides of the modified pulse spectrum are closer to one another. Therefore, a slightly modified IOTA pulse whose high sidelobes are clipped may be formed instead of the Gaussian MIOTA pulse.

Figure 14:
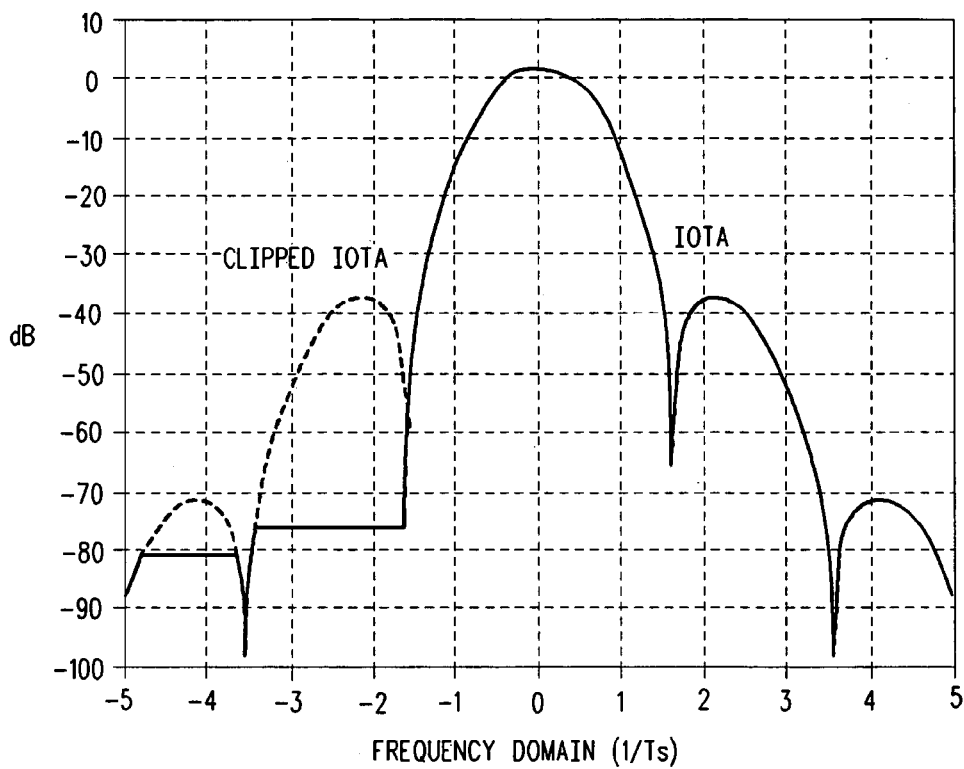
FIG. 14 illustrates a spectral diagram showing a design example of the frequency domain pulse clipping where a modified IOTA pulse is designed effectively by this clipping and inverse Fourier transform (IFT).

FIG. 14 illustrates a design example of frequency domain pulse by clipping. The modified IOTA pulse is designed effectively by this simple clipping technique. The power sensitivity loss (BER degradation) is virtually zero even though the clipping level is less than −70 dB. This occurs since the clipped IOTA pulse is much closer in appearance to the original IOTA pulse than the Gaussian pulse.

Figure 15:
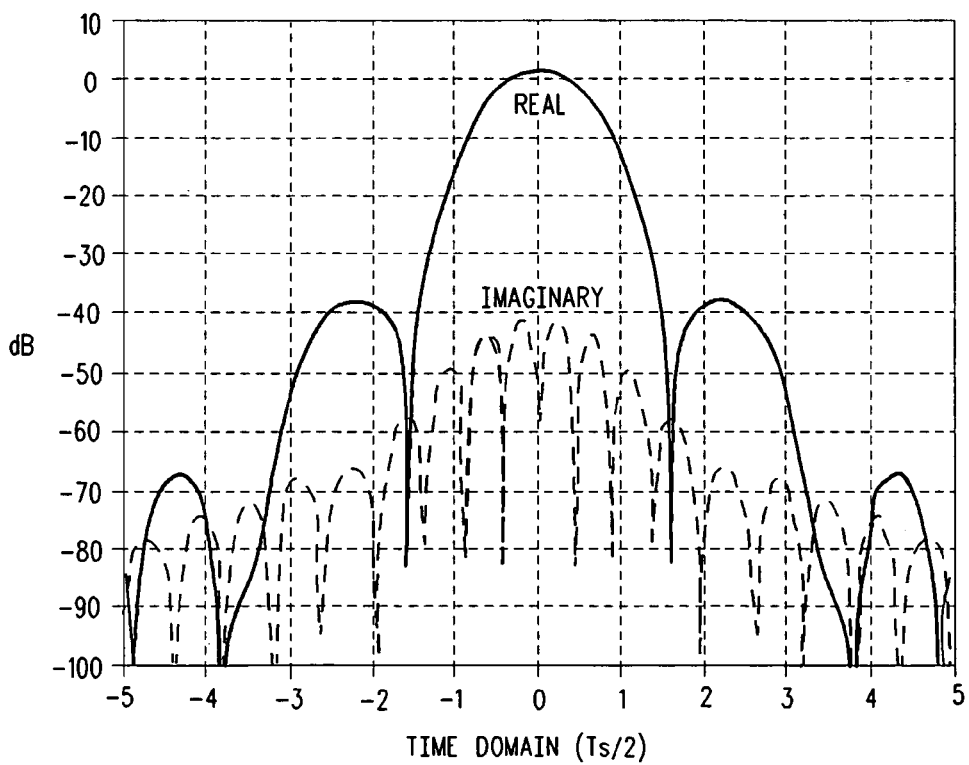
FIG. 15 is an inverse Fourier transform (IFT) diagram of the frequency domain pulse shown in FIG. 13 illustrating a complex pulse shape in view of non-symmetric spectrum.

Similarly, FIG. 15 is an illustration of a time domain MIOTA pulse, which is an IFT of the frequency domain pulse shown in FIG. 14. The normalized version of this is used as the new MIOTA. It is a complex pulse shape due to the fact that its spectrum is not symmetric. However, the BER degradation is negligible because the distortion amount is as small as possible as long as it meets the ACI requirements. However, it will increase the complexity of the pulse shape filtering by a factor of two since there is an imaginary component of the pulse.

Figure 16:
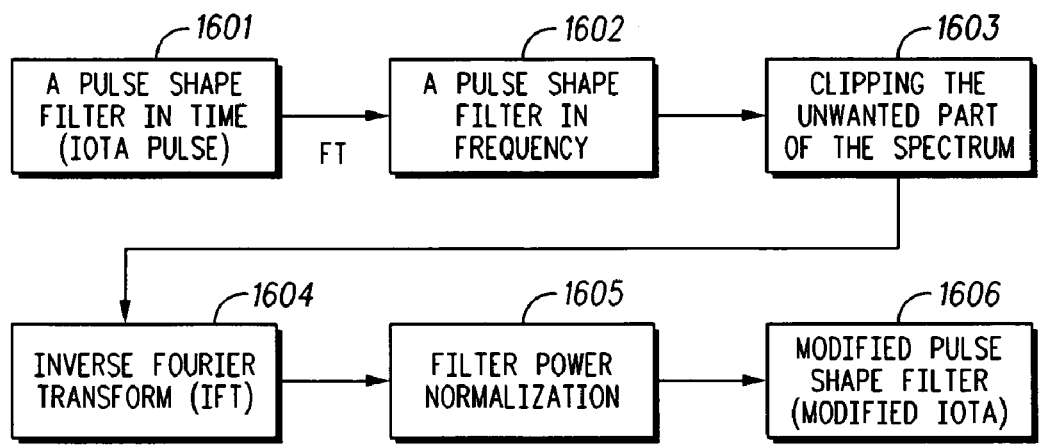
FIG. 16 is a block diagram illustrating a preferred method for modifying the pulse shape for low ACI pulse such as a clipped modified IOTA (MIOTA) pulse.

FIG. 16 is a block diagram showing a method to modify the pulse shape for low ACI. The IOTA pulse is generated 1601 and Fourier transformed 1602 to be a frequency domain pulse. However, this procedure is omitted in actual IOTA pulse modification because the ideal IOTA pulse has the same shape both in the time and frequency domain. Therefore, clipping 1603 starts from a general IOTA pulse assuming it is the frequency domain pulse. The typical design method includes clipping the unwanted portion of the sidelobes. The clipping level is determined by either the ACI requirement at the channel boundary or the adjacent channel coupled power ratio (ACCPR) requirement. As seen in FIG. 14, this is implemented by replacing the pulse values with low constant values where the high sidelobes are located as illustrated by the diagram. The clipped frequency domain pulse is inverse Fourier transformed 1604 to a time domain complex pulse. The complex pulse is then normalized 1605 and the MIOTA pulse is completed 1606.

Figure 17:
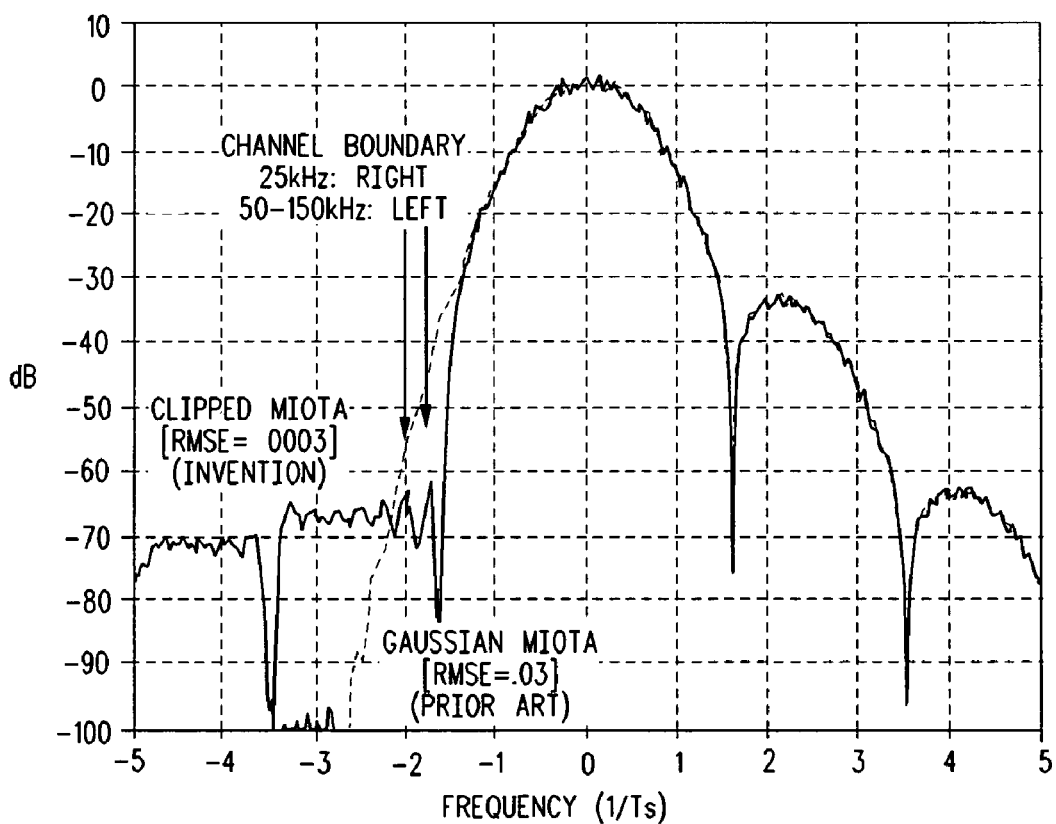
FIG. 17 is an analytical spectral diagram comparing a clipped modified IOTA (MIOTA) pulse and Gaussian MIOTA pulse.

FIG. 17 illustrates an analytical spectrum comparison diagram between clipped MIOTA and Gaussian MIOTA pulses. The clipped MIOTA demonstrates a lower ACI and the smaller power efficiency loss than the Gaussian MIOTA. The actual sidelobe level of the clipped MIOTA in PSD is slightly higher than that in the frequency domain signal shown in FIG. 14. This is due to power normalization and the limited pulse length in the time domain. However, the sidelobes are low enough to meet a −60 dB ACI requirement at the channel boundary. The ACI of the clipped MIOTA at the channel boundary is superior to that of the Gaussian MIOTA because the main lobe of the clipped MIOTA is narrower than that of the Gaussian MIOTA. Also the power sensitivity loss of the clipped MIOTA measured in the root mean squared error (RMSE) of the detected symbols is much smaller (approximately 0.0003) than that of the Gaussian MIOTA (approximately 0.03). If the RMSE is less than 0.01, then the power sensitivity loss appears negligible in a BLER plot. The ACI of IOTA OFDM will be slightly increased in view of the composite of the PSD of MIOTA pulses at the several outer subchannels.

Figure 18:
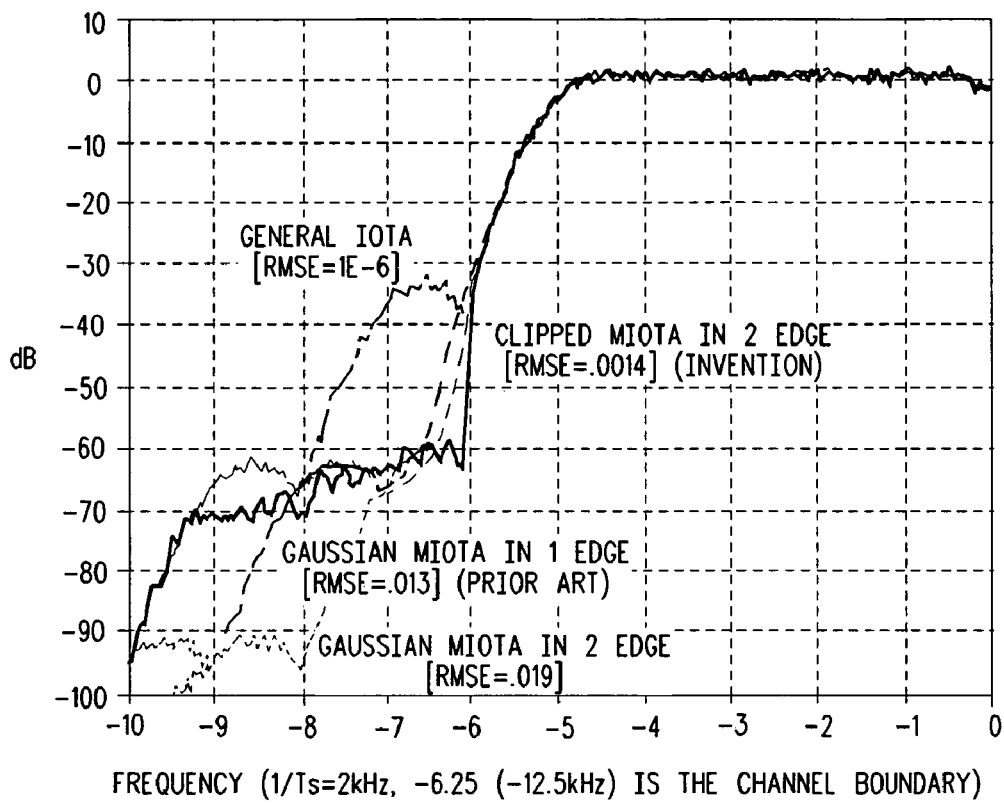
FIG. 18 is the spectrum comparison diagram illustrating IOTA OFDM using an ACI suppression scheme with the general IOTA, the Gaussian MIOTA, and the clipped MIOTA in the 25 KHz IOTA OFDM with 10 subchannels.

FIG. 18 and Table 2 show the simulation results of IOTA OFDM with the ACI suppression scheme. The IOTA OFDM has 10 subchannels (4 ksym/sec) in a 25 kHz channel. An IOTA pulse has 50 samples per symbol and 8Ts length in this simulation (Ts=500 μsec). FIG. 18 illustrates the PSD of several IOTA OFDM systems with the general OFDM, the Gaussian IOTA, or the clipped IOTA as the low ACI pulse of the edge subchannels. The measured RMSE is also showed estimating the power sensitivity loss of each system.

Table 2 explains the ACI suppression performance in detail. It illustrates the measured ACI, ACCPR, and the power efficiency loss in RMSE and in BER degradation at $10^{-3}$ BER of each IOTA OFDM. The ACI at the channel boundary is measured while the maximum signal power level at the outside of the channel boundary is reduced when the main channel average signal power is normalized to 0 dB. This is the maximum interfering signal power level at the adjacent channel. The average interfering signal power level at the adjacent channel is measured in adjacent channel coupled power ratio (ACCPR). This is the ratio of the average interfering signal power at the adjacent channel divided by the main signal power at the main channel (the on-channel power). The on-channel power is approximately −0.2 dB in this simulation. The ACI suppression scheme performs better than any other when the clipped MIOTA is adopted at the edge four subchannels. The bandwidth of the clipped MIOTA OFDM is reduced by ~17% at −40 dB even though it is still larger than that of RRC OFDM. It has virtually no power loss.

TABLE 2

ACI Reduction by an ACI Suppression Scheme With MIOTA

| Simulation Result | ACI at the Boundary | ACCPR | RMSE | .1% BER Degradation |
|---|---|---|---|---|
| IOTA | −32 dB | −45 dB | 10E−6 | 0 dB |
| Gaussian MIOTA (2 outer subchannels) | −38 dB | −58 dB | .013 | <.1 dB |
| Gaussian MIOTA (4 outer subchannels) | −42 dB | −63 dB | .019 | .1 dB |
| Clipped MIOTA (4 outer subchannels) | −58 dB | −70 dB | .0014 | 0 dB |

BTRRC

The BTRC pulse shape (or filter) equation was discussed in the publication IEEE Communications Letters, Vol. 5, No.

9, September 2000, by N. C. Beaulieu, C. C. Tan and M. O. Damen entitled "Better than" Nyquist Pulse." The BTRC pulse shape can be expressed as:

$$p(t) = \operatorname{sinc}(2Bt)\frac{4\beta\pi t\sin(2\pi\beta at) + 2\beta^2\cos(2\pi B at) - \beta^2}{4\pi^2 t^2 + \beta^2}, \quad (7)$$

where $\beta = \ln(2)/(\alpha B)$

The bandwidth B=1/(2Ts) where Ts is a symbol interval and a is a roll-off factor. Generally, it is preferable to have this filter as a total channel filter in a noiseless system. Therefore, a square root form of this filter, i.e., BTRRC, is used as the transmitting filter and the matched receiving filter. However, there is no closed form equation of the BTRRC so the BTRRC should be calculated using a Fourier transform method. The BTRC pulse length and the number of FFT and IFFT will be very large to get accurate BTRRC. Typically, 200Ts length BTRC and 40000 point FFT may be used as simulation parameters.

Figure 19:
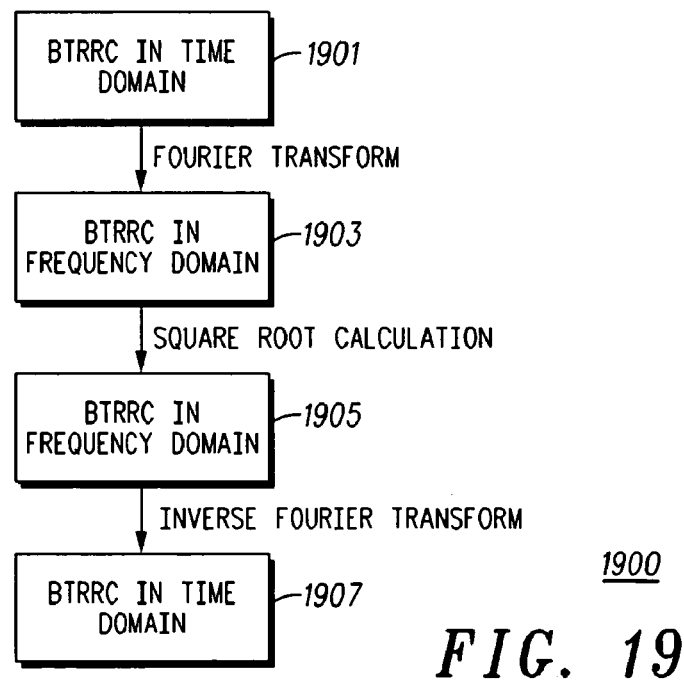
FIG. 19 illustrates a block diagram of an alternate embodiment of the invention, showing better than root raised cosine (BTRRC) interference reduction.

FIG. 19 illustrates a block diagram of an alternate embodiment used in the invention, showing a method for implementing better than root raised cosine (BTRRC) pulse shape 1900. According to this method, a time domain BTRRC waveform of equation (7) 1901 is transformed to a frequency domain waveform 1903 by Fourier transform. This wave form is converted to a square root form 1905 of the frequency domain waveform. The wave form is then transformed back to a time domain waveform 1907 by inverse Fourier transform. Thus, a BTRRC pulse shape is obtained by the Fourier transform method.

Figure 20:
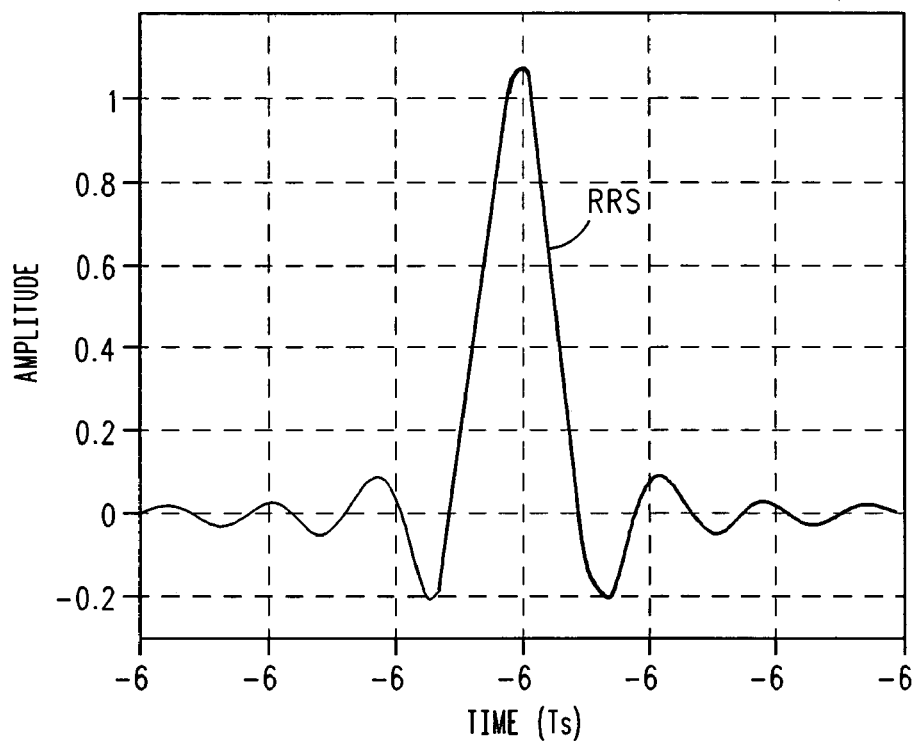
FIG. 20 is a graphical representation of RRC and BTRRC pulse shapes.
Figure 21:
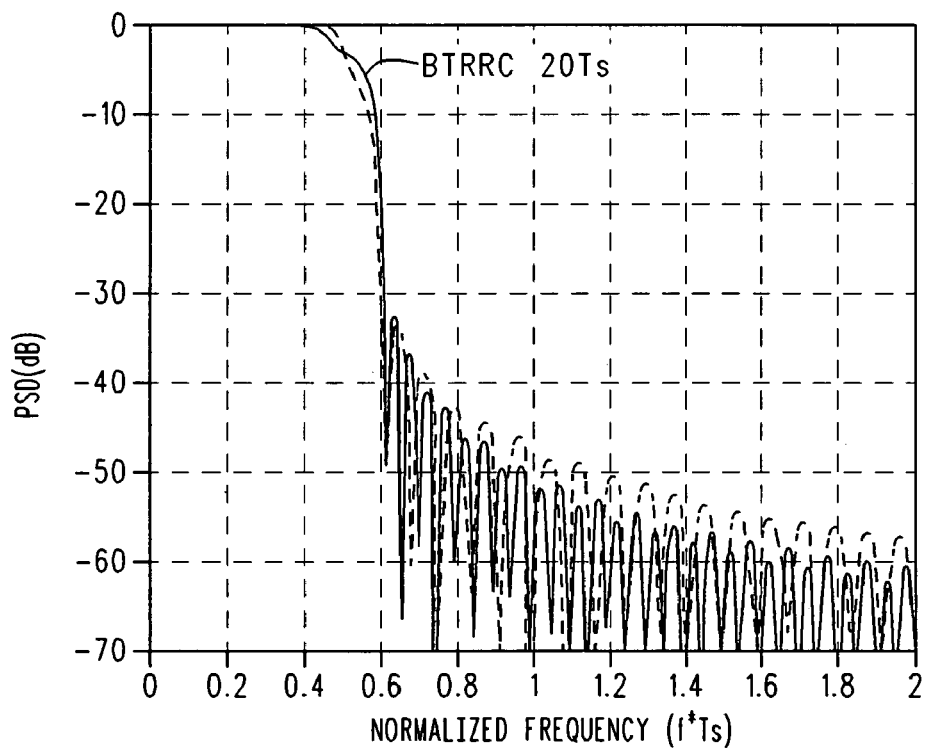
FIG. 21 is a graph illustrating analytical PSD of RRC and BTRRC.

As seen in FIG. 20, the pulse shape of the BTRRC is similar to that of RRC but the BTRRC fades out slower than the RRC in time domain. Therefore, the BTRRC with length 20Ts is recommended to substitute the RRC with a length 12Ts. The power spectral density (PSD) of the BTRRC with length 20Ts is comparable to that of the RRC with length 12Ts. The PSD of the BTRRC is narrower than that of the RRC at about −35 dB or lower but is wider at about −35 dB or higher as in FIG. 21.

Figure 22:
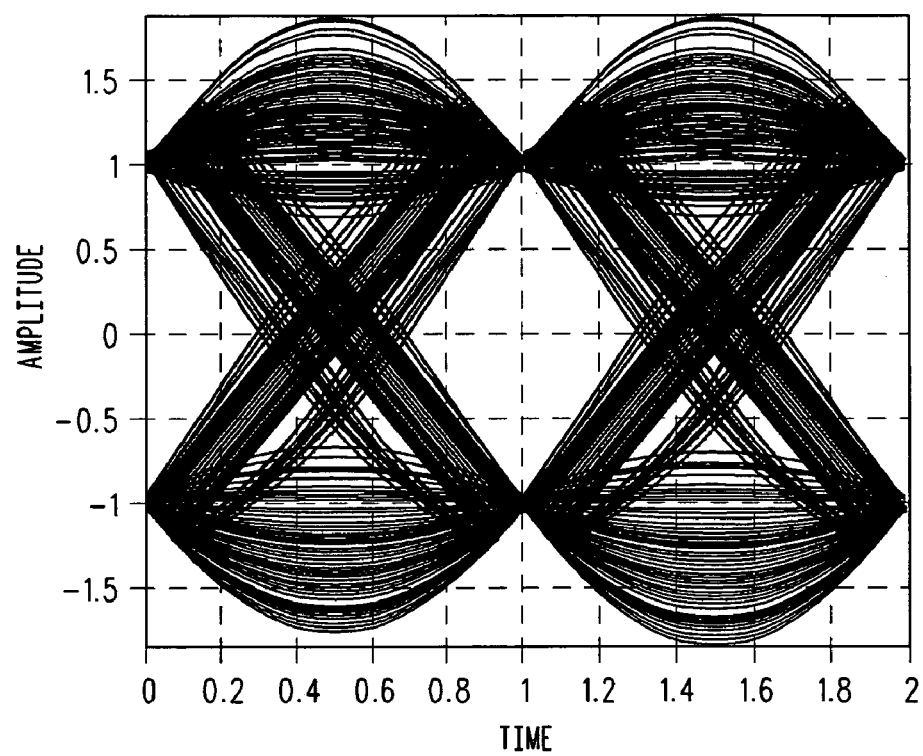
FIGS. 22 and 23 are graphs representing the eye pattern of BPSK with BTRRC with 20Ts (Ts: a symbol interval) and 12Ts, respectively.
Figure 23:
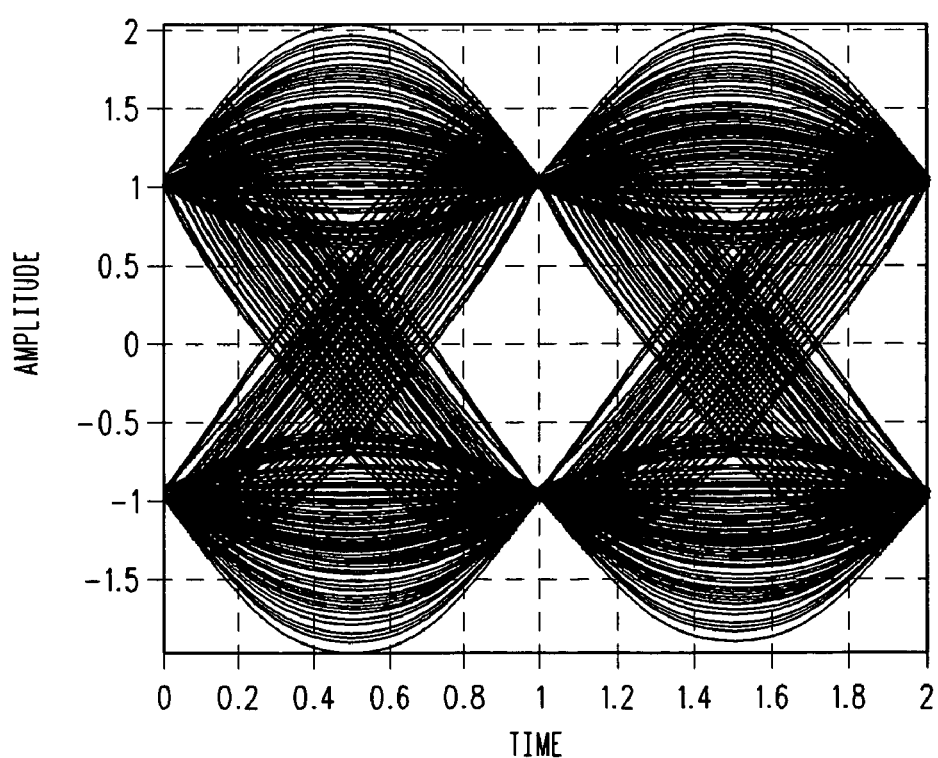
Figure 24:
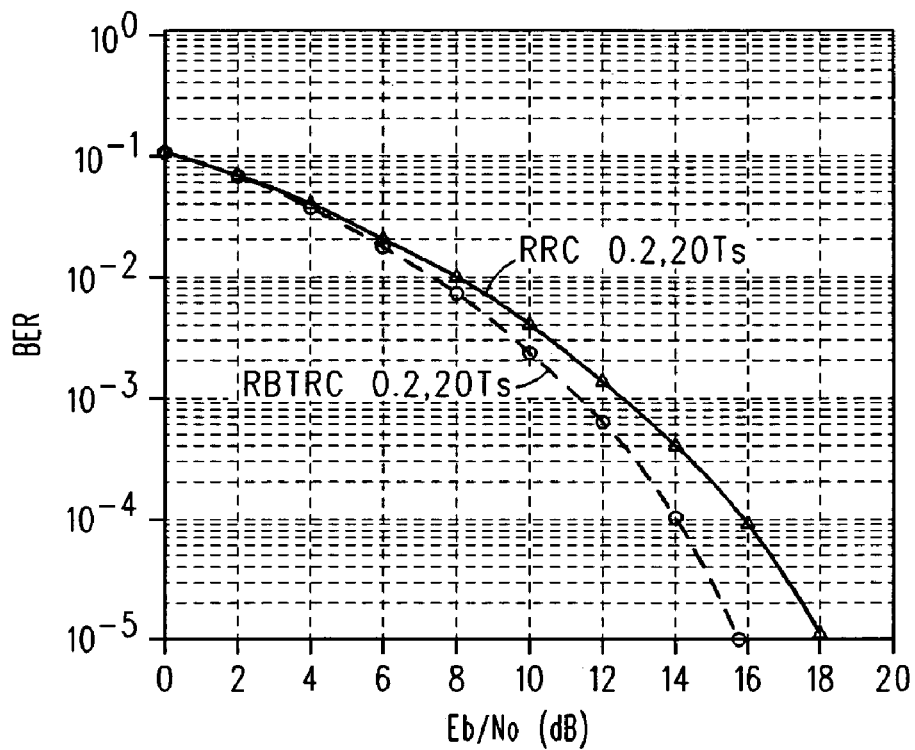
FIG. 24 is a graph illustrating BPSK bit error rate with 20% (0.2Ts) timing error in additive white Gaussian noise (AWGN) channel.

As seen in FIGS. 22 and 23, the advantage of BTRRC over RRC is that the eye of BTRRC is larger than the eye of RRC. Therefore, in a BPSK system, the BER with BTRRC is better than the BER with RRC as in FIG. 24 when there is timing error, while the BER of BTRRC is not better (slightly worse but almost the same) than the BER of RRC as in FIG. 25 when there is no timing error. However, the timing error is the biggest issue in a simulcast system. The simulcast system transmits the same signal at the same time from several base stations. Therefore, the received signals have different timing because of the different fading channels. Thus, usually the simulcast system requires a big eye pulse shape even though the system loses a great deal of spectral efficiency. The BTRRC has a larger eye than RRC but can substitute RRC without any other system change. Therefore, any modulation with BTRRC will provide a considerable "robustness" for timing error without losing spectral efficiency. The BTRRC is better than RRC when a timing problem exists such as in simulcast system. BTRRC also shows better BER than RRC in Nakagami fading channels and co-channel interference environments according to N. C. Beaulieu and J. Cheng's paper "BER Performance of A Novel Pulse Shape in Cochannel Interference," submitted in VTC 2004.

BTRRC OFDM

In a paper by B. Le Floch, M. Alard, and C. Berrous entitled "Coded Orthogonal Frequency Division Multiplexing," Proceedings of the IEEE, Vol. 83, No. 6, June 1995, IOTA OFDM the first Offset OFDM offering the low adjacent channel interference using a fast fading IOTA pulse was discussed. The data symbols of this Offset OFDM have real-imaginary alternation both in time and frequency while also exhibiting orthogonality when the frequency spacing of the sub-carriers is 1/Ts. It should be recognized by those skilled in the art that IOTA OFDM has better spectral efficiency than SAM (scalable advanced modulation) when there are high numbers of sub-carriers yet has a lesser efficiency with smaller numbers of sub-carriers. Consequently, RRC OFDM was later recognized as the second Offset OFDM and the spectral efficiency of RRC OFDM was greater than similar modulation types for any given number of sub-carriers.

The third possible pulse found for the Offset OFDM is BTRRC. BTRRC OFDM is an offset OFDM with a BTRRC pulse, which also has its real and imaginary data symbol alternations both in the time domain and frequency domain. The BTRRC pulses are unexpectedly orthogonal to each other when they are spaced 1/Ts in frequency and Ts/2 in time. This is compared with IOTA pulses which are orthogonal in IOTA OFDM and RRC pulses which are orthogonal in RRC OFDM. Therefore, the implementation of BTRRC can be accomplished by substituting RRC with BTRRC in the RRC OFDM implementation of equation (4).

Figure 26:
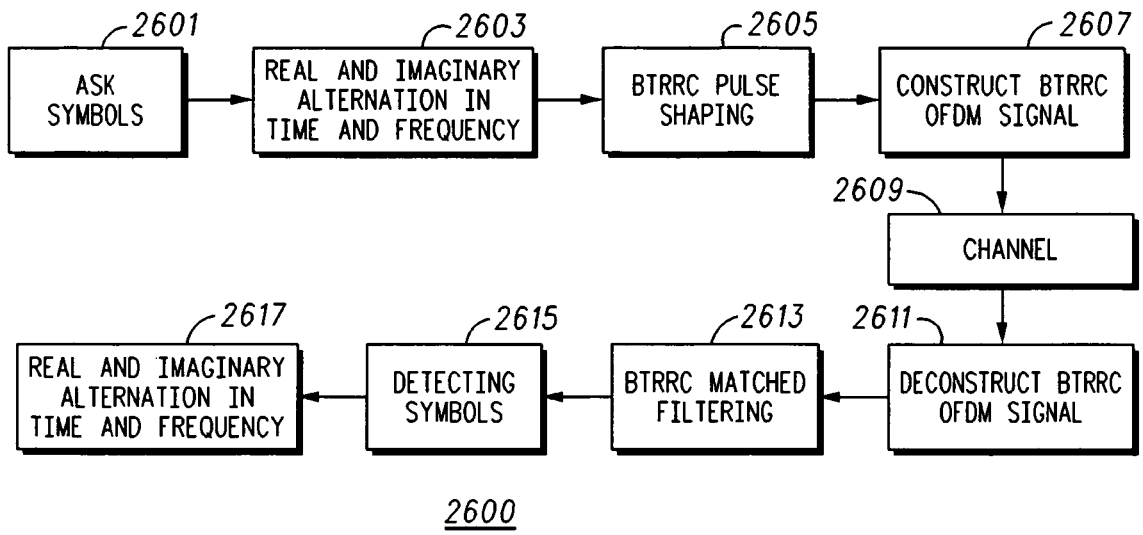
FIG. 26 is a simplified block diagram showing implementation of BTRRC modulation using polyphase filtering.

FIG. 26 is simplified block diagram illustrating the method of implementing BTRRC OFDM 2600 according to the preferred method of the invention. Amplitude shift keying (ASK) symbols are generated 2601, which are normalized real symbols with generally 2, 4, and 8 signal levels. The BTRRC OFDM with 2, 4, and 8 level ASK corresponds to the general OFDM with QPSK, 16QAM and 64QAM. The real and imaginary alternation 2603 in the ASK symbol matrix is shown by $j^{n+m}$ in equation (4) so that all the adjacent ASK symbols of a real ASK symbol are imaginary and all the adjacent ASK symbols of an imaginary ASK symbol are real both in time and frequency domain. The subcarrier signals are generated 2605 by using an BTRRC filter while the subcarrier signals are constructed 2607 with 1/Ts frequency spacing as also seen in equation (4) where P(t) is BTRRC of equation (7).

As will be further recognized by those skilled in the art, more practically the foregoing steps may be implemented by using overlap-added methods or polyphase filtering, which are the advanced digital signal processing (DSP) schemes. Further, the BTRRC OFDM signals are transmitted 2609 on a channel, then demodulated using deconstruction 2611 and matched filtering techniques 2613 by the matching procedure of steps 2605 and 2607. The ASK symbols are detected 2615 and the real and imaginary alternation as performed in step 2603 is compensated 2617. In analytical simulation models implemented using poly-phase filtering, it was recognized that there is no power sensitivity loss from the subchannel overlap in additive white Gaussian noise (AWGN) channel due to the perfect orthogonality of BTRRC OFDM.

Figure 27:
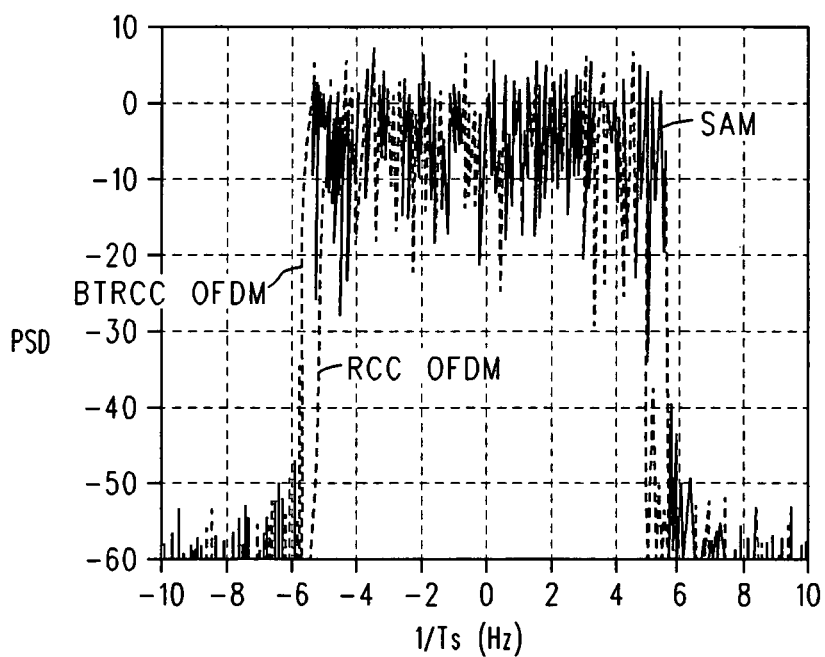
FIG. 27 is a graph illustrating the simulated PSD (power spectral density) of SAM, RRC OFDM and BTRRC OFDM with 10 sub-channels.

BTRRC OFDM is more advantageous over RRC OFDM in a simulcast environment as BTRRC is more advantageous over RRC in a simulcast environment. As seen in FIG. 27, the spectrum of BTRRC OFDM is typically better than SAM or IOTA OFDM since the spectrum of BTRRC OFDM is almost identical with the spectrum of RRC OFDM. The frequency spectrum plot shown in FIG. 27 is the PSDs of SAM, RRC OFDM, and BTRRC OFDM with 10 subchannels at the same data rate.

Figure 25:
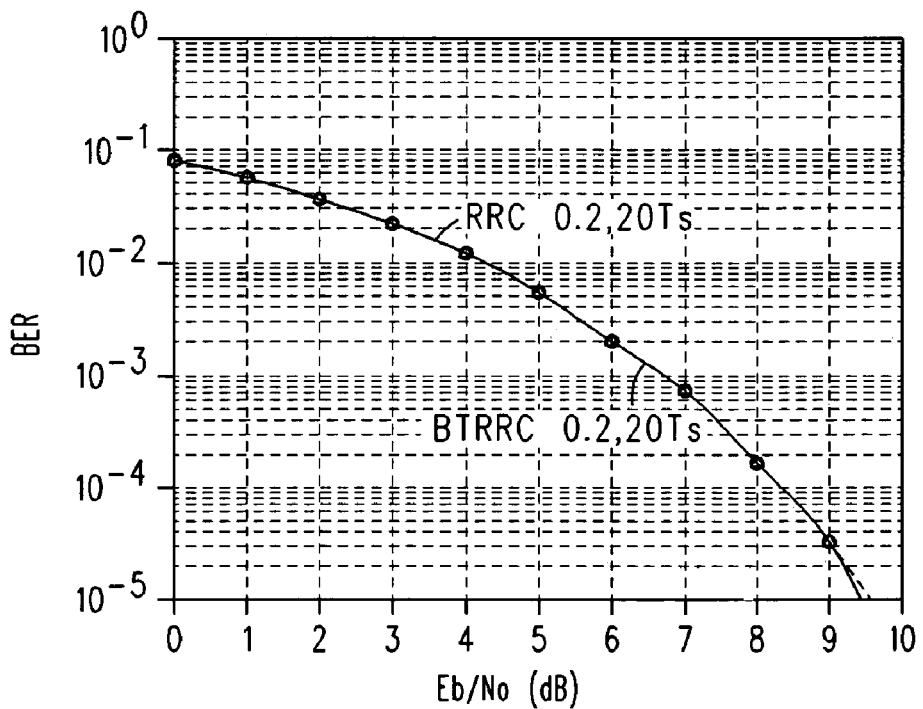
FIG. 25 is a graph illustrating BPSK bit error rate without any timing error in AWGN channel.
Figure 28:
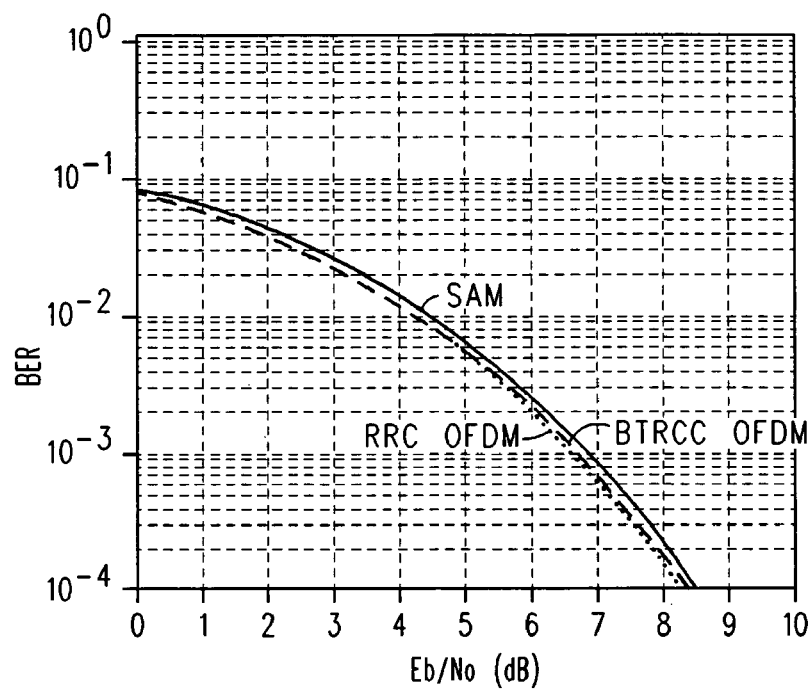
FIG. 28 is a graph illustrating bit error rate of BTRRC OFDM, RRC OFDM and SAM in AWGN channel.
Figure 29:
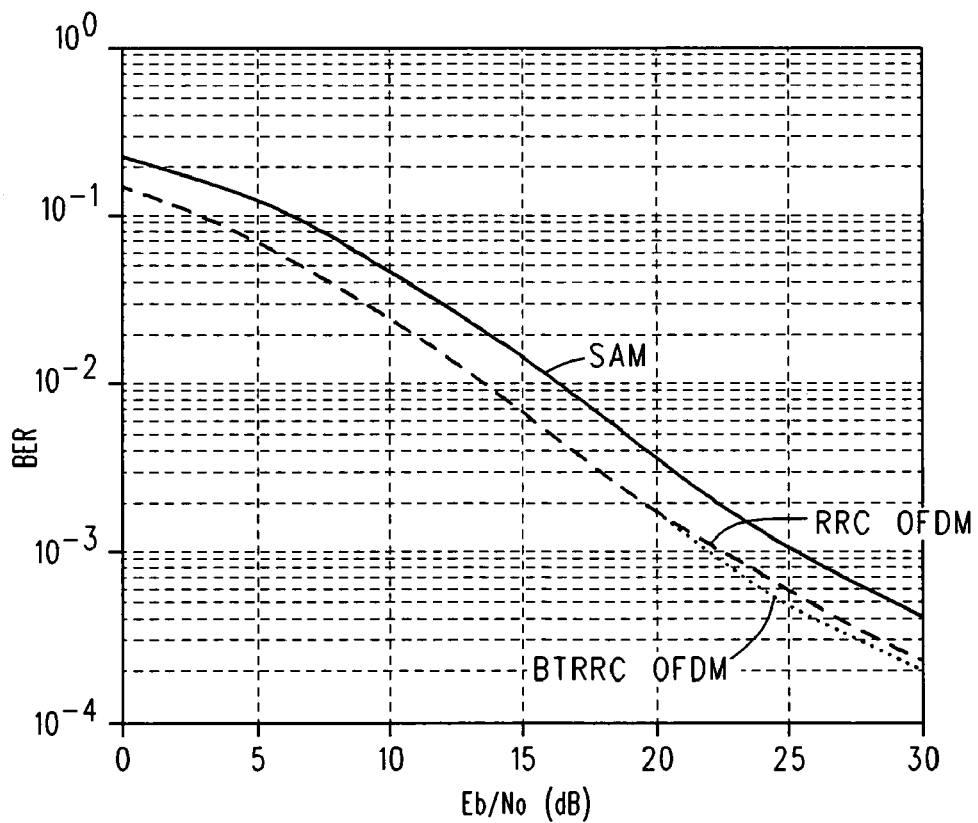
FIG. 29 is a graph illustrating the bit error rate of RRC OFDM, BTRRC OFDM and SAM in a TU50 selective fading channel.

Therefore, BTRRC OFDM is highly recommended as a substitute for simulcast SAM, as RRC OFDM is recommended as a substitute for the general SAM, because the BTRRC OFDM will exhibit better performance than simulcast SAM both in power and spectrum. The BER performance of BTRRC OFDM comparison with that of SAM and RRC OFDM is shown in FIG. 28 and FIG. 29. These are in AWGN and TU50 fading channel when the pilot interpolation is not adopted. The BER advantage of BTRRC OFDM over SAM is clear but the advantage over RRC OFDM is less advantageous in AWGN or a flat fading channel (TU50 is close to flat fading). It will be evident to those skilled in the art that this will be significant in a simulcast environment as shown in FIG. 25. The major drawback of BTRRC OFDM is that 20Ts length pulse is used to achieve satisfactory performance instead of the 12Ts length pulse of RRC OFDM; however, this would be considered as a minimal cost for the increase for the BER improvement. The ACI suppression scheme can also be applied to the BTRRC OFDM with modified BTRRC as it could be applied to RRC OFDM with the modified RRC in the prior art. The modified BTRRC can be derived from BTRRC in the same manner as the modified RRC was derived from the RRC in the prior art.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A system for reducing adjacent channel interference (ACI) in a multicast multicarrier modulation system comprising:

a generator for generating a spectrally efficient modified pulse for multicast multicarrier modulation using better than root raised cosine orthogonal frequency division multiplexing (BTRRC OFDM) in an Offset OFDM structure, wherein the BTRRC is expressed as a square root form of:

$$p(t) = \text{sinc}(2Bt)\frac{4\beta\pi t\sin(2\pi\beta\alpha t) + 2\beta^2\cos(2\pi B\alpha t) - \beta^2}{4\pi^2 t^2 + \beta^2},$$

where $\beta = \ln(2)/(\alpha B)$ where bandwidth B=1/(2Ts) and where Ts is a symbol interval and α is a roll-off factor;

and wherein the BTRRC is calculated using a Fourier transform, the BTRCC providing better bit error rate (BER) than the BER achieved with RRC in presence of timing errors;

and wherein the Offset OFDM structure is expressed by $$S(t) = \sum_{m=0}^{M-1} j^m s_m^o(t)\exp(j2\pi(m/T_s - f_o)t)$$

$$= \sum_{m=0}^{M-1} \sum_{n=-\infty}^{\infty} j^{n+m} a_{m,n} p(t - nT_s/2)\exp(j2\pi(m/T_s - f_o)t)$$

where m is a subcarrier number or a symbol number in frequency, $s_m(t)$ is the signal s(t) of $m^{th}$ subcarrier, M is the number of total subcarriers, (Ts) is a symbol duration, and $f_o$ is a frequency shift; and at least one processor for adapting the spectrally efficient modified pulse at the edge of subchannel for reducing the ACI product by the total multicarrier signal.

2. A system for reducing ACI in a multicarrier modulation system as in claim 1, wherein the modified pulse has fast fading sidelobes having a substantially low amount of distortion as compared with an unmodified pulse.

3. A system for reducing ACI in a multicarrier modulation system as in claim 1, wherein the spectrally efficient modified pulse at the edge of the subchannel has substantially low amplitude sidelobes.

4. A system for reducing ACI in a multicarrier modulation system as in claim 1, wherein only one of the sidelobes of the modified pulse is reduced.

5. A system for reducing ACI in multicarrier modulation system as in claim 1, wherein the number of edge subchannels that use the spectrally efficient modified pulse shape is determined by the spectral characteristic of the original and modified pulse shape and the multicarrier signal structure.

6. A system for reducing ACT in multicarrier modulation system as in claim 1, wherein the step of adapting includes meeting standard channel interference requirements.

7. A method for reducing adjacent channel interference (ACI) in a multicast multi-carrier modulation system comprising the steps of:

generating a spectrally efficient modified pulse for the multicast multi-carrier modulation using better than root raised cosine orthogonal frequency division multiplexing (BTRRC OFDM) in an Offset OFDM structure, wherein the BTRRC is expressed as a square root form of:

$$p(t) = \text{sinc}(2Bt)\frac{4\beta\pi t\sin(2\pi\beta\alpha t) + 2\beta^2\cos(2\pi B\alpha t) - \beta^2}{4\pi^2 t^2 + \beta^2},$$

where $\beta = \ln(2)/(\alpha B)$ where bandwidth B=1/(2Ts) and where Ts is a symbol interval and α is a roll-off factor;

and wherein the BTRRC is calculated using a Fourier transform, the BTRCC providing better bit error rate (BER) than the BER achieved with RRC in presence of timing errors;

and wherein the Offset OFDM structure is expressed by $$S(t) = \sum_{m=0}^{M-1} j^n s_m^o(t)\exp(j2\pi(m/T_s - f_o)t)$$

$$= \sum_{m=0}^{M-1} \sum_{n=-\infty}^{\infty} j^{n-m} a_{m,n} p(t - nT_s/2)\exp(j2\pi(m/T_s - f_o)t)$$

where m is a subcarrier number or a symbol number in frequency, $s_m(t)$ is the signal s(t) of $m^{th}$ subcarrier, M is the number of total subcarriers, (Ts) is a symbol duration, and $f_o$ is a frequency shift; and adopting the spectrally efficient modified pulse at the edge sub-channels for reducing the ACI of the total multi-carrier signal.

8. A method for reducing ACI in a multi-carrier modulation system, as in claim 7, wherein the spectrally efficient modified pulse is generated having fast fading sidelobes with a substantially low amount of distortion from the original pulse.

9. A method for reducing ACI in a multi-carrier modulation system, as in claim 7, wherein the modified pulse has low amplitude sidelobes.

10. A method for reducing ACI in a multi-carrier modulation system, as in claim 7, wherein only one side sidelobes of the modified pulse are reduced.

11. A method for reducing ACI in a multi-carrier modulation system, as in claim 7, wherein the number of edge subchannels that use the spectrally efficient modified pulse shape is determined by the spectral characteristic of the original and modified pulse shape and the multicarrier signal structure.

12. A method for reducing ACI in a multi-carrier modulation system, as in claim 7, wherein the step of adapting includes meeting standard channel interference requirements.

13. A method for reducing adjacent channel interference (ACI) in a multi-carrier modulation system comprising the steps of:
generating a spectrally efficient modified pulse with fast fading sidelobes for the multicast multi-carrier modulation using better than root raised cosine orthogonal frequency division multiplexing (BTRRC OFDM) in an Offset OFDM structure, wherein the BTRRC is expressed as a square root form of:

$$p(t) = \mathrm{sinc}(2Bt)\frac{4\beta\pi t\sin(2\pi\beta\alpha t) + 2\beta^2\cos(2\pi B\alpha t) - \beta^2}{4\pi^2 t^2 + \beta^2},$$

where $\beta = \ln(2)/(\alpha B)$ where bandwidth $B=1/(2Ts)$ and where Ts is a symbol interval and $\alpha$ is a roll-off factor;

and wherein the BTRRC is calculated using a Fourier transform, the BTRCC providing better bit error rate (BER) than the BER achieved with RRC in presence of timing errors;

and wherein the Offset OFDM structure is expressed by $$S(t) = \sum_{m=0}^{M-1} j^m s_m^o(t)\exp(j2\pi(m/T_s - f_o)t)$$
$$= \sum_{m=0}^{M-1} \sum_{n=-\infty}^{\infty} j^{n+m} a_{m,n} p(t - nT_s/2)\exp(j2\pi(m/T_s - f_o)t)$$

where m is a subcarrier number or a symbol number in frequency, $s_m(t)$ is the signal s(t) of $m^{th}$ subcarrier, M is the number of total subcarriers, (Ts) is a symbol duration, and $f_o$ is a frequency shift; and reducing the amplitude of single side lobes of the modified pulse; and adapting the spectrally efficient modified pulse at the edge sub-channels for reducing the ACT of the total multicast multi-carrier signal to meet predetermined channel interference requirements.

14. A method for reducing ACT in a multi-carrier modulation system, as in claim 13, wherein the number of edge subchannels that use the spatially efficient pulse shape is determined by the spectral characteristic of the original and modified pulse shape and the multicarrier signal structure.

* * * * *